(12) United States Patent
Yuan et al.

(10) Patent No.: US 11,246,171 B2
(45) Date of Patent: Feb. 8, 2022

(54) METHOD, SYSTEM AND DEVICE FOR CONNECTING DEVICES

(71) Applicant: BANMA ZHTXTNG NETWORK (HONGKONG) CO., LIMITED, Kowloon (HK)

(72) Inventors: Zhijun Yuan, Hangzhou (CN); Xinhua Yu, Hangzhou (CN); Guanglin An, Hangzhou (CN)

(73) Assignee: BANMA ZHIXING NETWORK (HONGKONG) CO., LIMITED

( * ) Notice: Subject to any disclaimer, the term of this patent is extended or adjusted under 35 U.S.C. 154(b) by 581 days.

(21) Appl. No.: 15/864,789

(22) Filed: Jan. 8, 2018

(65) Prior Publication Data

US 2018/0199386 A1  Jul. 12, 2018

(30) Foreign Application Priority Data

Jan. 9, 2017 (CN) .......................... 201710013459.9

(51) Int. Cl.
| | |
|---|---|
| G06K 19/07 | (2006.01) |
| G06K 19/077 | (2006.01) |
| G08C 17/02 | (2006.01) |
| H04L 29/06 | (2006.01) |
| H04L 29/08 | (2006.01) |
| H04W 76/10 | (2018.01) |
| H04L 12/28 | (2006.01) |
| H04W 4/70 | (2018.01) |
| G08C 17/00 | (2006.01) |
| H04W 4/80 | (2018.01) |
| H04W 84/12 | (2009.01) |
| H04W 84/18 | (2009.01) |
| H04W 8/00 | (2009.01) |

(52) U.S. Cl.
CPC ............ *H04W 76/10* (2018.02); *G08C 17/00* (2013.01); *H04L 12/28* (2013.01); *H04L 12/2803* (2013.01); *H04L 67/125* (2013.01); *H04L 67/141* (2013.01); *H04L 67/2823* (2013.01); *H04W 4/70* (2018.02); *G08C 2201/93* (2013.01); *H04W 4/80* (2018.02); *H04W 8/005* (2013.01); *H04W 84/12* (2013.01); *H04W 84/18* (2013.01)

(58) Field of Classification Search
None
See application file for complete search history.

(56) References Cited

U.S. PATENT DOCUMENTS

| | | | |
|---|---|---|---|
| 6,714,778 B2 | 3/2004 | Nykanen | |
| 7,570,943 B2 | 8/2009 | Sorvari | |

(Continued)

FOREIGN PATENT DOCUMENTS

WO    2016210327    12/2016

*Primary Examiner* — Nicholas R Taylor
*Assistant Examiner* — Ho T Shiu
(74) *Attorney, Agent, or Firm* — Van Pelt, Yi & James LLP

(57) ABSTRACT

Executing applications includes: establishing a connection with an IoT device; receiving a signal from the IoT device; obtaining one or more data adapters corresponding to the IoT device, the one or more data adapters being determined based in part on information from signal received from the IoT device; processing the signal according to the one or more data adapters; and transmitting the processed signal to a corresponding application or an operating system to execute corresponding operations.

26 Claims, 15 Drawing Sheets

(56) References Cited

U.S. PATENT DOCUMENTS

| | | |
|---|---|---|
| 7,681,203 B2 | 3/2010 | Mandato |
| 8,244,179 B2 | 8/2012 | Dua |
| 8,823,494 B1 | 9/2014 | Kovitz |
| 10,002,526 B1 * | 6/2018 | Dyer .................... G08C 17/02 |
| 2002/0173295 A1 | 11/2002 | Nykanen |
| 2003/0028390 A1 | 2/2003 | Stern |
| 2005/0020278 A1 | 1/2005 | Krumm |
| 2006/0083187 A1 | 4/2006 | Dekel |
| 2008/0004926 A1 | 1/2008 | Horvitz |
| 2009/0013061 A1 | 1/2009 | Winter |
| 2013/0238917 A1 | 9/2013 | Zhong |
| 2014/0082501 A1 | 3/2014 | Bae |
| 2014/0351446 A1 | 11/2014 | Cho |
| 2015/0139659 A1 | 5/2015 | Oshima |
| 2016/0036764 A1 * | 2/2016 | Dong .................. H04L 61/6022 370/254 |
| 2016/0119434 A1 | 4/2016 | Dong |
| 2016/0127514 A1 * | 5/2016 | Maksumov ......... H04L 41/0226 709/202 |
| 2016/0241999 A1 * | 8/2016 | Chin ...................... G08C 23/04 |
| 2017/0124853 A1 | 5/2017 | Mehta |
| 2017/0359237 A1 * | 12/2017 | Hao ...................... H04W 12/08 |
| 2018/0129924 A1 * | 5/2018 | Cutrignelli ......... G06K 19/0712 |
| 2019/0172579 A1 | 6/2019 | Peterson |

\* cited by examiner

METHOD, SYSTEM AND DEVICE FOR CONNECTING DEVICES

CROSS REFERENCE TO OTHER APPLICATIONS

This application claims priority to People's Republic of China Patent Application No. 201710013459.9 entitled A METHOD, MEANS, TERMINAL DEVICE AND OPERATING SYSTEM FOR ASSOCIATING DEVICES, filed Jan. 9, 2017 which is incorporated herein by reference for all purposes.

FIELD OF THE INVENTION

The present application generally relates to the field of terminal device technology and more particularly, to a method, system and device for connecting devices, as well as an Internet of Things (IoT) operating system for connecting devices.

BACKGROUND OF THE INVENTION

With the terminal device technology developing to encompass an increasing number of device types, for example, screen-based devices, screenless devices, wearable devices and household devices, more and more people have become users of such terminal devices, and more and more functionalities and services have become available at such terminal devices. Services provided at terminal devices generally are in the form of applications (also referred to as apps), with the interface for accessing the services generally configured at a home screen or a desktop of the terminal device. Presently, different services are provided through different applications that specialize in servicing a particular type of user needs.

Meanwhile, technologies such as the Internet of Things (IoT) are allowing for more and more objects and virtual representations of such objects to connect to and communicate over a network (e.g., the Internet). Unsurprisingly, users would like to be able to, at their terminal device (e.g., mobile phones or tablet or the like), control or manage or operate IoT devices/objects in a convenient and intelligent manner as appropriate.

However, there are a variety of types of IoT devices and objects, which are designed and manufactured by various vendors and according to various standards. Moreover, IoT devices are experiencing increased complexity from being able to host more types of sensors, provide more on-device data processing power, and the like. Therefore, allowing terminal devices the access to IoT devices and objects in order to detect contexts thereat is an important aspect of enhancing the functionalities and services available at the terminal devices in the era of ubiquitous connectivities.

BRIEF DESCRIPTION OF THE DRAWINGS

Various embodiments of the invention are disclosed in the following detailed description and the accompanying drawings.

DETAILED DESCRIPTION

Figure 1:
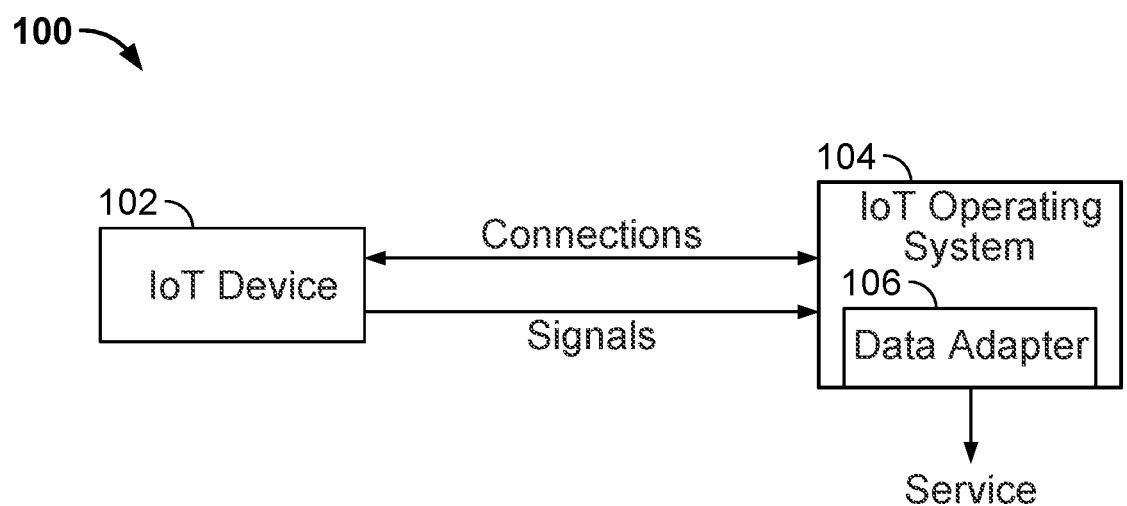
FIG. 1 is a schematic diagram illustrating an example of connecting devices, in accordance with one or more embodiments of the present disclosure.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The term "terminal device" as used herein refers to a computing device enabled with applications such as multimedia software and services. Examples of a terminal device include a smart phone, a tablet, a wearable device, a set-top box, a personal computer, a smart television, a smart household appliance, a desktop computer, a laptop computer, an in-vehicle computer, an Internet of Things (IoT) object, or the like. A terminal device can be configured to provide services of audio, video, data, etc. to a user.

The terms "component," "service," "model," "applications," and "system" as used herein refer to a computer-related entity, including hardware, software, middleware, or a combination thereof. For example, a component may be, but is not limited to, a process running on a processor, an object, an executable, a thread of execution, a program, and/or a computer. One or more components may reside within a process and/or thread of execution and a component may be installed on one computer and/or distributed between two or more computers.

The term "Internet of Things" (IoT) as used herein refers to the technology implementing the architecture that a large number of objects (e.g., device), not limited to computers or computer networks, are configured to be readable, recognizable, locatable, and controllable via a network (e.g., the Internet). Example objects of an IoT network can include a variety of information-gathering devices such as RFID equipped devices, infrared sensor equipped devices, global positioning systems (GPS) equipped devices, laser scanner equipped devices, and the like. In the age of ubiquitous connectivity of things, terminal devices of users are becoming increasingly diverse to include devices with screens, devices without screens, household devices, wearable devices, and the like.

According to various embodiments of the present application, "signal" refers to a data structure in the device. The signal can include device data and device-received data. Device data includes software and hardware data in the device, such as device software interaction instruction data, sensor signals, and various interface data. Device-received data includes various instruction data and hardware and interface data received by the device. For example, a device that receives interface data concerning the plugging in of earphones could call a playing app to play audio data such as songs. Thus, by connecting to IOT devices, it is possible to receive signals from various IOT devices. For example, if a device senses an external Bluetooth signal, it connects the corresponding Bluetooth earphone or other Bluetooth device. In another example, if a device senses temperature data from a weather app, it can instruct the air-conditioning system to turn on or otherwise operate an HVAC system. It is thus possible to receive various kinds of data from devices and to provide users with service functions by perceiving the corresponding app context. Signals include signals received by terminal devices from IOT devices. The signals may include those signals received from an IoT device at a terminal device, such as IoT device-related information and data awaiting processing. For example, the signals may include device identifiers (ID) information, signal data such as temperature signal data, exercise-related signal data, and other signal data from IoT devices. In some embodiments, signals may further include device type, device address, and the like.

According to various embodiments of the present disclosure, a signal can be generated by or received at a signal source such as a motion sensor, a network card, or a temperature app. A signal source obtains signals in various manners, for example, via passive triggering (e.g., without a user's active initiation of triggering) or active triggering (e.g., with a user's active initiation of triggering). With regard to passive triggering, a signal source obtains signals from, for example, an external device, a sensor, an internal device, or the like. The signals can be obtained from various device internal or related information data such as broadcast information, app information, or notification information, device status information generated based on device statuses, etc. With regard to active triggering, a signal source obtains signals upon a user's operation of the triggering. For example, when a user scans a QR code, a device acquires a QR code signal, which corresponds to a particular service. For another example, a user's active initiation of triggering to obtain signals from a signal source can be a user clicking to share a link or express a widget related to a service agent, or a user selecting a signal from a set of signals provided. With the ability to obtain various signals from various signal sources, services corresponding to obtained signals can be provided to users accordingly.

In some embodiments of the present disclosure, data adapters are determined based on at least a part of the information included in the signals of an IoT device. A part of or the entire information included in the signals indicates the data suitable for or needed by the adapters to process. Thus, the signals adapted by the adapters can be recognized and processed by the operating system. For example, signals can be converted from a captured device signal voltage to a calibrated unit measure of temperature, which is recognizable by the operating system. These data adapters may comprise dynamic libraries. In some embodiments of the present disclosure, when a program developer builds applications or services utilizing signals from IoT devices, platform-defined interfaces can be used to implement the corresponding component of Signal Provider. Signal Provider is configured to monitor and receive signals such as to provide signals to upper level applications or components (e.g., Actuator Provider) for the purpose of providing context-based services. More details of Signal Provider are described with reference to FIG. 5. In some embodiments, based on different contexts, the processing of signals can be encoded in the form of data adapters (e.g., dynamic libraries or other executable codes such as Androids' BluetoothAdapter and Wifimanager), and loaded into platforms or systems as a data adapter. Thus, signals corresponding to various IoT devices and contexts can be obtained through platforms, systems, or developing frameworks, facilitating the provision of context-based services. As used herein, a dynamic library refers to a library of codes (computing instructions) and data, which can be simultaneously called or used by multiple programs.

According to various embodiments of the present disclosure, contexts include operating scenarios involving IoT devices, including various scenarios under which operations are executed at an IoT device according to the signals at the IoT device. In other words, contexts include scenarios where operations are executed based on signals being detected. For example, using a mobile phone, a temperature signal is obtained from a weather service, the temperature signal indicating that the current temperature is over 30°. In response to this signal, a home air-conditioning system is turned on. In another example, a home security system detects that nobody is at home and the door is locked. A security signal indicating this state is generated. In response to this security signal, a lighting control agent is determined as the service agent to be executed. Based on this signal, the lights and other such household appliances are turned off, preventing the home resources from being wasted.

FIG. 1 illustrates a schematic diagram of an example of connecting devices, in accordance with an embodiment of the present disclosure. In this example, system 100 comprises one or more IoT devices 102 and one or more IoT operating systems 104. IoT operating system 104 is configured with one or more data adapters 106. While a single IoT device, a single IoT operating system and a single data adapter are shown for purposes of example, different number of IoT devices, IoT operating systems, and data adapters can be used in other embodiments. IoT operating system 104 can be implemented by, for example, one or more devices with operating systems such as TinyOS, RIOT, Contiki, Mantis OS, Nano RK, LiteOS, FreeRTOS, Apache Mynewt, Zephyr OS, Ubuntu Core 16 (Snappy), ARM mbed, Android Things, Yocto, Raspbian, etc. IoT operating system 104 can also be implemented by, for example, proprietary operating systems such as Windows 10 IoT, VxWorks, Freescale MQX, Mentor Graphics Nucleus RTOS, Green Hills Integrity, Particle, etc. In general, IoT operating system 104 is configured in communication with a network of one or more IoT devices 102 and with access to various data adapters 106 so that data is collected, processed, and transmitted for the purposes of managing and operating of IoT devices on the network. IoT operating system 104 is configured to simplify the application programming and system integration that utilizes IoT devices 102 by providing unified interfaces to interact with lower level functionalities of IoT devices 102 and adapters 106.

In some embodiments, a service platform such as Signal Provider Platform is configured to provide context-aware services. The service platform is configured to comprise a set of one or more servers (e.g., a server farm or a server group), through which signals are obtained and in turn transmitted to a corresponding context at a terminal device. Alternatively, a context can be obtained by use of the server group and in turn transmitted to a terminal device for processing. A server group is a service cluster consisting of one or more servers. In some embodiments, a service platform can be configured to reside in or be a part of an IoT system such that a terminal device (e.g., a smart phone, a tablet, etc.) can directly connect to IoT devices. With direct access to IoT devices, a terminal device can be configured to detect contexts at the IoT devices, and consequently provide corresponding services based on the contexts.

In some embodiments, an operating system is configured to determine the interfaces at which an IoT device can be connected. Example interfaces include but are not limited to, Bluetooth, Wi-Fi, infrared, cellular, and other wired or wireless based interfaces. Thus, based on the interface information, IoT devices can be identified by a search such that connection can be established with at least one IoT device returned by the search result. Next, the operating system obtains the data adapters for the contexts corresponding to the IoT devices. Using the data adapters, the signals can be adapted accordingly such that corresponding logic processing can be executed.

One data adapter can be configured to adapt one or more signals. At such data adapters, signals can be registered, canceled (unregistered), and/or subjected to logic processing. After an IoT device generates or obtains a signal, the signal is sent to a service platform such as an operating system. The corresponding service platform receives the signal, and uses a data adapter to analyze the signal. Accordingly, a context corresponding to the received signal is detected, and the corresponding service operations are executed to provide the user with the corresponding context-aware service. In particular, after the signal is processed at a data adapter, the processed signal is sent to an application or an operating system such that the application or the operating system can determine the corresponding service agent based on the signal, and subsequently execute the corresponding operations according to the service agent.

In particular, an application is configured with one or more service agents, which are used to detect service contexts and to execute logic processing upon the detected contexts. Once a service agent is tied to a particular device and an operating environment, an instantiated service agent is an Agent Instance, an executing entity of the service agent. Thus, an application is configured to detect contexts and to execute corresponding services, based on the service agent. In other words, an application, using a service in the system background to monitor signals, detects contexts and executes logic processing of the detected contexts via a service agent.

Figure 2:
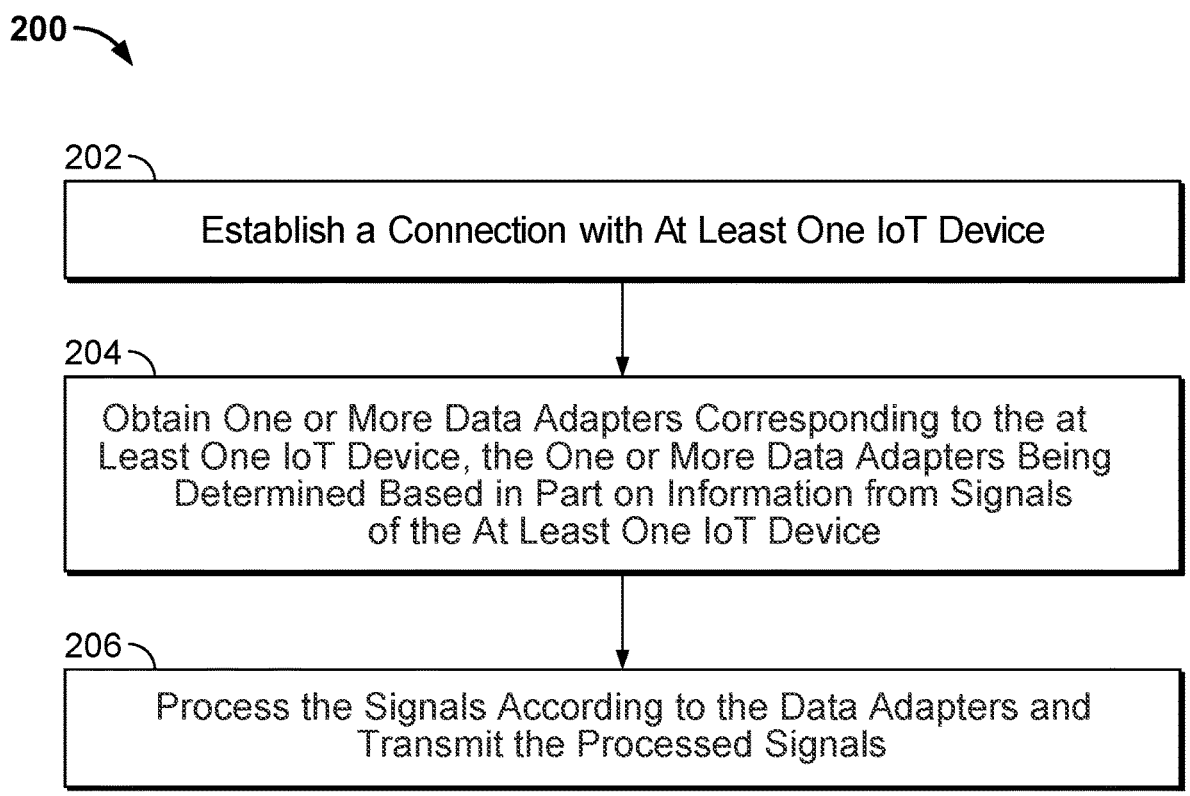
FIG. 2 is a flowchart illustrating an example process for connecting devices, in accordance with one or more embodiments of the present disclosure.

FIG. 2 illustrates a flowchart of an example process for connecting devices, in accordance with an embodiment of the present disclosure. Process 200 can be implemented by, for example, IoT operating system 104 of FIG. 1.

Process 200 starts at 202 where a connection with at least one IoT device is established. For example, such a connection can be a Bluetooth connection, a Wi-Fi connection, or a Zigbee connection.

At 204, data adapters corresponding to the connected at least one IoT device are obtained. In this example, the data adapters are determined based on at least a part of the information included in the signals from the connected at least one IoT device. As will be described in greater detail below, the determination can be made by using the information pertaining to the types of signals being transmitted at the corresponding access modules such as a Bluetooth module or a Wi-Fi module of the IoT device.

At 206, signals are processed based on the obtained data adapters, and the processed signals are transmitted. In some embodiments, the processed data is transmitted to an application or an operating system of a terminal device such as a smart phone. In some other embodiments, the processed data is transmitted to a control program or processing system of another IoT device.

In this example, a service platform can be configured with multiple access interfaces or modes. Each of these access interfaces of modes can be used to search for one or more IoT devices capable of being connected to the service platform using the interface or mode. Next, connections with the one or more IoT devices returned by the search results are established via configured modes such as Bluetooth, Wi-Fi, etc. With successfully established connections with the one or more IoT devices, data adapters for the context corresponding to the connected IoT devices are obtained to analyze signals and execute the logic processing. In some embodiments, a service platform can be configured to accept access or connection requests via all the access interfaces or modes for the purpose of connecting to IoT devices and receive signal therefrom. In some embodiments, a dynamic library can be developed with regard to the access interfaces and modes such as to obtain signals for analysis and logic processing.

In some embodiments, IoT devices generate various signals. For example, a home security system can be configured to generate a signal indicating that a door is properly locked. As another example, an HVAC system can be configured to generate a signal indicating that an air-conditioning system is turned on. Such signals can be transmitted to a service platform. Upon receiving the signals, the service platform can be configured to utilize the corresponding data adapters to analyze the signals and to transmit the processed signals to an application or operating system. Thus, the application or the operating system detects the contexts corresponding to the signals, and executes operations corresponding to the detected contexts, achieving providing the user with context-based services.

In some embodiments, the present disclosure can be applied to the IoT technology. For example, a mobile phone operating system can be configured to detect a context such as to control an IoT system to execute corresponding operations upon the detected context. For another example, the operating system of an in-vehicle device can also be configured to detect a context for controlling the cruising of the vehicle accordingly. Therefore, monitored signals can comprise various signals received from IoT devices, the contexts corresponding to the monitored signals are subsequently determined and operations corresponding to the contexts are executed accordingly. For example, signals from a lighting system on a household network, signals from a security system, and signals from various smart household appliances including smart kitchen appliances can all be transmitted through corresponding interfaces to the service platform of mobile terminal devices such as a smart phone. Next, the IoT operating system obtains the corresponding data adapters (e.g., a dynamic library). Upon receiving the signals, the data adapters are used to analyze the signals to detect the contexts and to execute the processing of the detected contexts. Accordingly, connection to IoT devices can be established quickly and easily, resulting in quick detection of matching contexts corresponding to the IoT devices, and enhanced user experience with context-based services.

Figure 3:
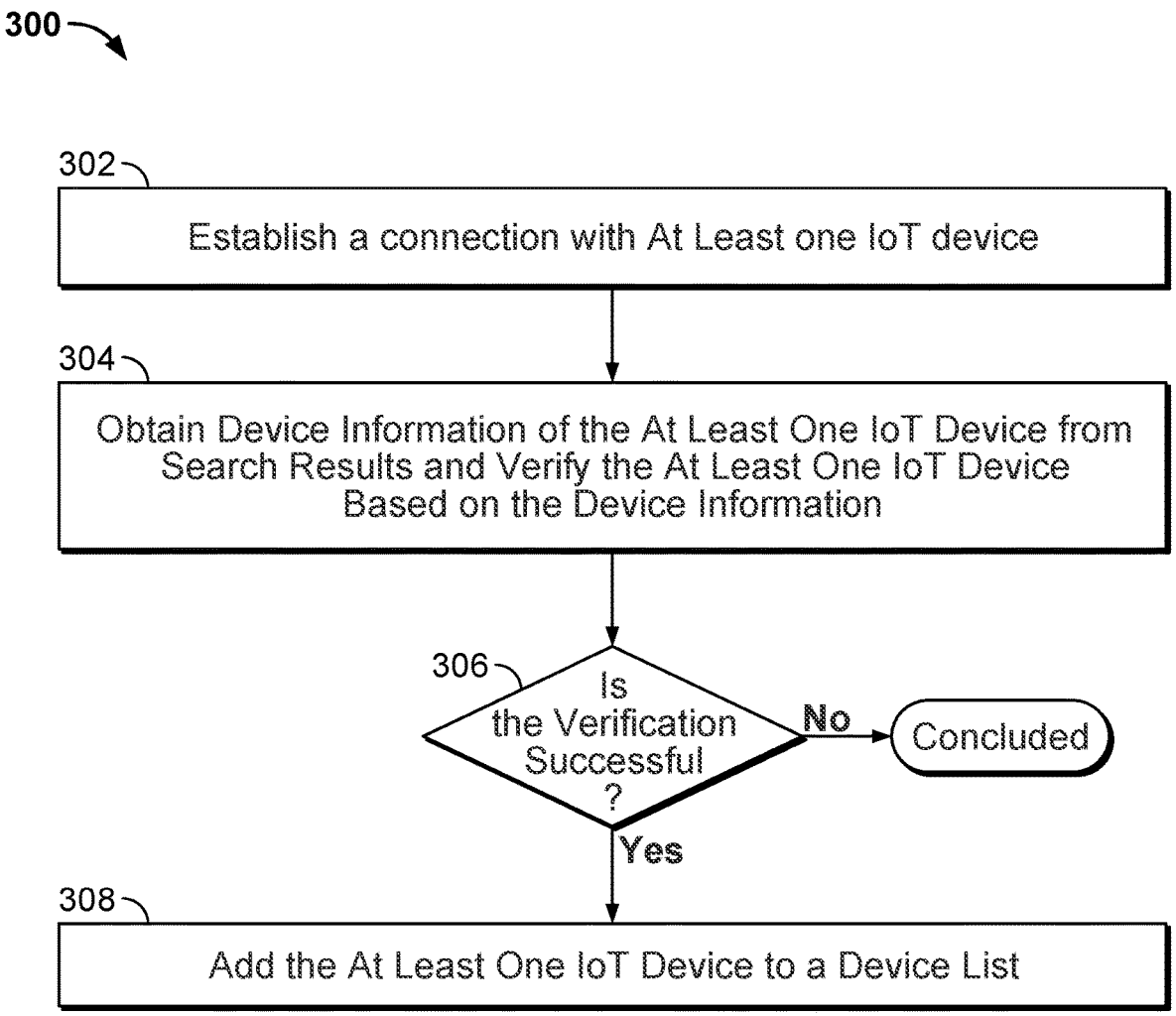
FIG. 3 is a flowchart illustrating an example process for adding IoT devices, in accordance with one or more embodiments of the present disclosure.

FIG. 3 illustrates a flowchart of an example process for adding IoT devices, in accordance with an embodiment of the present disclosure. Process 300 can be implemented by, for example, IoT operating system 104 of FIG. 1.

Process 300 starts at 302 where a connection with at least one IoT device is established.

In some embodiments, IoT devices are connected onto an IoT operating system via various access modes. Access modes are determined based on access connectivity modules' (e.g., electronic devices for transmitting signals to and receiving signals from other devices or networks) configurations of respective access modes. For example, access connectivity modules can comprise a Bluetooth module, a Wi-Fi module, a Z-Wave module, a Zigbee module, a CoAP module, a cellular module and the like; and the corresponding access modes are Bluetooth, Wi-Fi, Z-Wave, Zigbee, CoAP protocol, 3G, and the like. Access modes comprise, for example, SPI (serial peripheral interface) mode and serial port communication mode.

In some embodiments, establishing a connection with at least one IoT device comprises: searching to identify IoT devices that are capable of being connected with, receiving a search result returning at least one such IoT device, establishing respective connections with the at least one IoT device returned in the search result, and obtaining connection results with regard to the respective establishing of connections. In this example, IoT devices are searched at a Wi-Fi, Bluetooth, cellular, and the like networks, and a search result is generated. For each of the IoT devices returned in the search result, a respective connection is established separately therewith. Next, connection results are obtained from the connection feedback or acknowledgement generated by each IoT device. Such connection results include, for example, results from IoT devices in response to the connection establishment, and device information of the IoT devices. Thus, the IoT operating system can either directly establish connections based on the results, or establish connections based on the results after verifying the IoT devices using the device information.

In some other embodiments, establishing a connection with at least one IoT device comprises: receiving connection requests for at least one IoT device, establishing connections with the at least one IoT device, and obtaining connection results with regard to the connection with the at least one IoT device to be established. For example, a connection result can indicate a successfully established connection, or a connection failed to be established, or a connection pending a certain number of retries. Alternatively, an IoT device can also initiate a request to connect with an IoT operating system on its own. In that case, an IoT device sends a connection request to a responding IoT operating system, which in turn receives the connection request from at least one IoT device, and subsequently establishes a connection with the at least one IoT device. Similarly, the IoT operating system also obtains connection results from the feedback or acknowledgement from the IoT device.

In some embodiments, after a search result for at least one IoT device is received, the IoT devices returned in the search result are displayed at a user interface so that the user can choose an IoT device from the returned IoT devices to establish a connection with the selected IoT device. In this example, as the search result only returns the IoT devices that are capable of connecting with the system, with such IoT devices displayed at a user interface (such as the user interface shown in FIG. 4B), the user can select one or more particular IoT devices of interest to connect with. It can also be determined which IoT devices are already in the connected state at the interface. For example, even when a search result returns a group of IoT devices A, B and C, the user may only select one to connect with IoT device A, with an existing connection with IoT device B, and no connection with IoT device C. Further details are described with reference to FIG. 4B.

Referring back to FIG. 3, at 304, device information of the at least one IoT device is obtained from the connection results, and the at least one IoT device is verified based on the obtained device information.

In some embodiments, device information of an IoT device includes, for example, a device name, a device identifier, a device model number, a device type, and/or the like. Device information can be used to verify the identity of the devices. For example, a device identifier can be checked to determine whether the corresponding device has been registered on the IoT operating system. If it has been registered, then the device is considered as being verified successfully. Otherwise, the device is not considered as being verified. In other examples, information about a device model number, the manufacturer of the device, etc. can be checked to determine whether such a model and/or manufacturer is considered as a model or party or vendor supported by the IoT operating system. If supported, devices of such models and devices made by such manufacturers are considered verified for the IoT operating system.

At 306, it is determined whether the verification is successful.

If the verification is successful, process 300 continues to execute 308. If the verification fails, process 300 concludes, without establishing a connection with the at least one IoT device.

At 308, the verified IoT device is added to a device list. The at least one IoT device can be added to a device list after a successful verification of the IoT device.

Figure 4A:
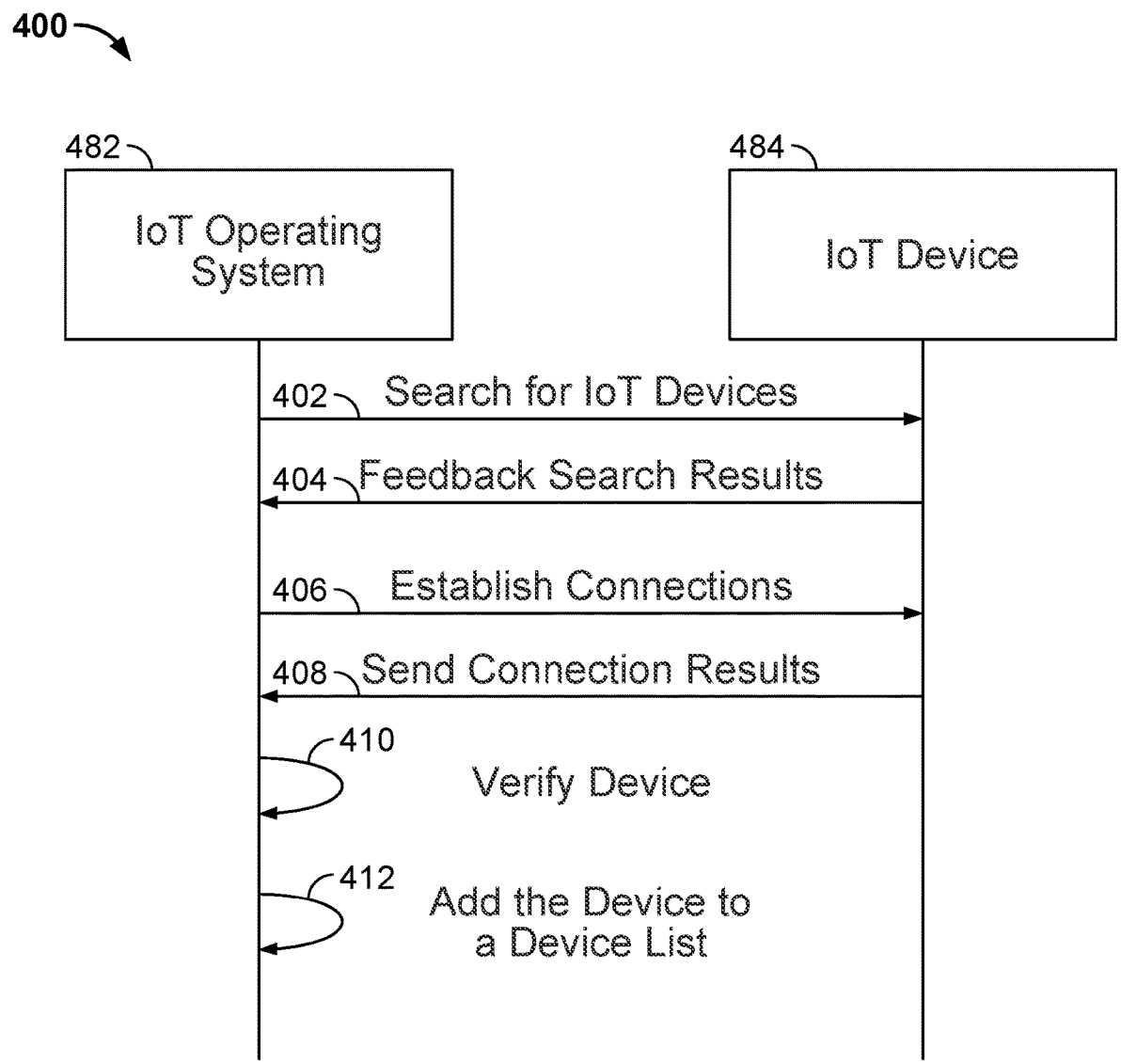
FIG. 4A is an interaction diagram illustrating an example interaction between an IoT device and a service platform, in accordance with one or more embodiments of the present disclosure.

FIG. 4A illustrates an interaction diagram of an example interaction between an IoT device and a service platform, in accordance with an embodiment of the present disclosure. System 400 can be implemented by, for example, system 100 of FIG. 1.

At 402, an IoT operating system 482 searches for IoT devices 484 such as the IoT devices capable of being discovered by a Bluetooth module using the "startDiscovery" method implemented using a Bluetooth adapter such as BluetoothAdapter object of Android. IoT operating system 482 can also search for IoT devices capable of being scanned/discovered by a Wi-Fi module using the "startScan" method implemented using a Wi-Fi adapter such as a WifiManager object of Android.

At 404, respective IoT devices send search results back to the IoT operating system as feedbacks. For example, for a Bluetooth module, such a feedback is obtained by registering to parse the "ACTION_FOUND" event that results from the "startDiscovery" method, while for a Wi-Fi module, a feedback is obtained by iterating from a list "ScanResult" returned by "getScanResults" method. Therefore, IoT devices capable of being connected are obtained through the search results. In some embodiments, those IoT devices are displayed at a user interface so that the user can select some particular IoT devices of interest to connect with. Already connected IoT devices can also be displayed at the interface. Further details are described with reference to FIG. 4B.

At 406, the IoT operating system sends connection requests to the IoT devices returned in the search results. For example, a connection request can be implemented via commands such as "start" of a BluetoothChatService object, "addNetwork" of a WifiManager object.

At 408, the IoT devices send back connection results with regard to the requested connection requests. For example, a connection result can include device information (device_info) of the respective IoT device.

At 410, the IoT operating system performs verification of respective IoT devices. For example, such verification can be done via the command "check_device" based on the device information (device_info) included in the connection results.

At 412, after the IoT operating system verifies one or more IoT devices successfully, the one or more verified IoT devices are added to a device list.

In some embodiments, the searching of IoT devices can be performed using available or configured access modes of the system, after which respective connections are in turn established. Further, the communication between IoT devices and the IoT operating system can be implemented through the following example data protocols described with references to Tables 1-6.

Here, an example communication protocol is shown in Table 1.

TABLE 1

| Name | Specification |
| --- | --- |
| Baud rate | 9600 |
| Data bits | 8 |
| Parity check | None |
| Stop bit | 1 |
| Data flow control | None |

A communication protocol as used herein refers to the rules that both parties to the communication must implement in order to achieve communication or service with each other. In this example, the communication between an IoT device and a corresponding IoT operating system is to occur at a Baud rate of 9600 bit/s, data bits of 8, and stop bit of 1, with no parity check or data flow control.

An example format of a data frame used by the communication protocol is as shown in Table 2.

TABLE 2

| Field | Length | Specification |
| --- | --- | --- |
| Frame header | 2 | Permanently set to 0x33CC |
| Version | 1 | Used for upgrades |
| Command word | 1 | Particular frame type |
| Data length | 2 | Describes subsequent data length |
| Data | | Specific content |
| Checksum | 1 | The mod 256 of the sum of the bytes from the frame header through the data content |

The above-described data format can be used for the communication between the IoT operating system and IoT devices. As shown here, a data frame includes information such as frame header, version, command word, data length, data content, and checksum.

In addition to data exchange based on the above-described data protocol and the communication protocol, a heartbeat test can be specified so as to check whether the connections between the IoT operating system and IoT devices are functioning normally. For example, in such a test, an IoT device can send heartbeat signals/data once every ten seconds. If there is no response within three seconds, the communication link is considered as abnormal.

An example heartbeat frame sent by an IoT device is shown in Table 3.

TABLE 3

| Field | Length | Specification |
| --- | --- | --- |
| Frame header | 2 | 0x33CC |
| Version | 1 | |

TABLE 3-continued

| Field | Length | Specification |
| --- | --- | --- |
| Command word | 0x01 | Sends heartbeat command |
| Data length | 0x00 | |
| Checksum | | |

An example heartbeat frame received by an IoT device is shown in Table 4.

TABLE 4

| Field | Length | Specification |
| --- | --- | --- |
| Frame header | 2 | 0x33CC |
| Version | 1 | |
| Command word | 0x02 | Receives heartbeat command |
| Data length | 0x00 | |
| Checksum | | |

Further, by use of the above-described data frame, IoT devices can report and receive information. An example format of reported data is as shown in Table 5.

TABLE 5

| Field | Length | Specification |
| --- | --- | --- |
| Frame header | 2 | 0x33CC |
| Version | 1 | |
| Command word | 0x03 | Sends a command to report information |
| Data length | | Determined according to specific content |
| Data | | Specific content |
| Checksum | | |

An example format of received data is as shown in Table 6.

TABLE 6

| Field | Length | Specification |
| --- | --- | --- |
| Frame header | 2 | 0x33CC |
| Version | 1 | |
| Command word | 0x04 | Receives a command to report information |
| Data length | | Determined according to specific content |
| Data | | Specific content |
| Checksum | | |

It is by use of the above-described protocols that IoT devices connect to a Bluetooth or a Wi-Fi module of a corresponding IoT operating system. Once connected, the respective functionalities to detect contexts are transmitted to applications handling such contexts, through the Bluetooth and/or the Wi-Fi modules based on the data protocols described above.

As a result, data can be analyzed based on the above-described data frame format. For example, for a data frame encapsulating a connection result, the frame type is obtained from the data frame. Then, if the frame type is identified as a type of connection result, device information is obtained from the data field.

Figure 4B:
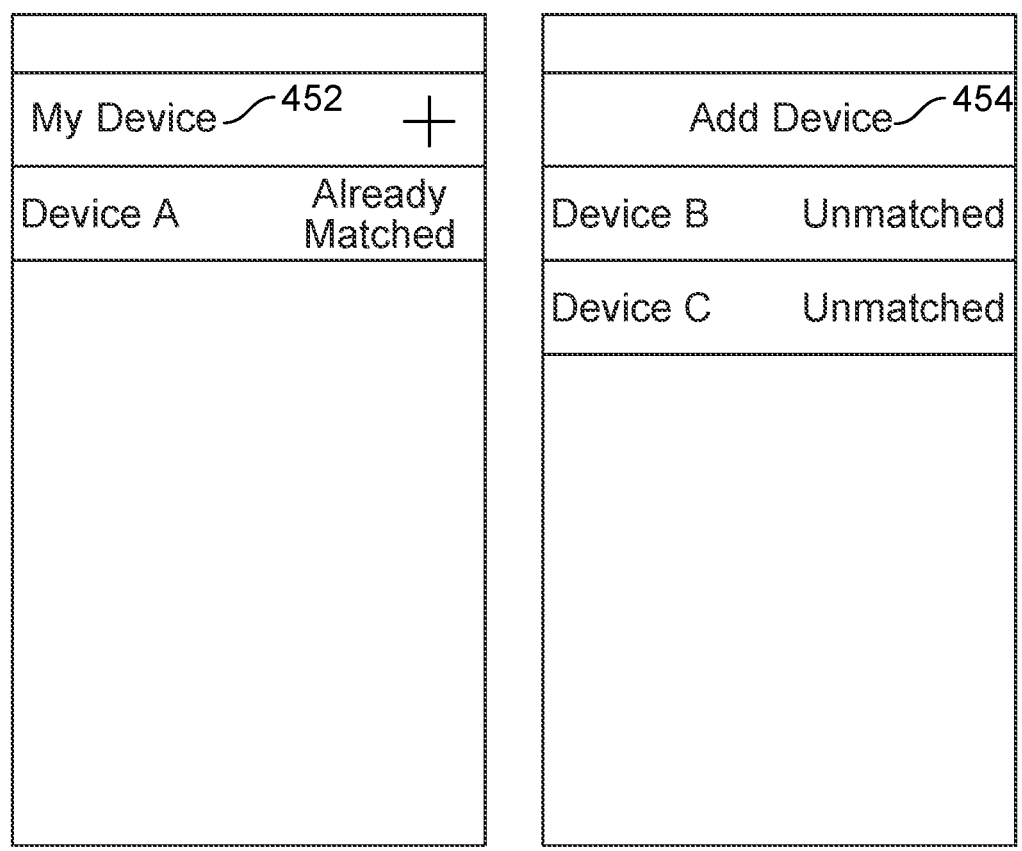
FIG. 4B is a schematic diagram illustrating an example user interface for connecting devices, in accordance with one or more embodiments of the present disclosure.

FIG. 4B illustrates a schematic diagram of an example user interface for connecting devices, in accordance with an embodiment of the present disclosure. In this example, user interface 450 is configured with two panels: a "My Device" panel 452 to the left hand side, and a "Add Device" panel 454 to the right hand side. As shown herein, Device A is displayed in "My Device" panel 452, and is annotated with the comment of "already matched" to indicate that Device A is already connected to the system for which user interface 450 is configured. A button labeled with "+" is also displayed in the "My Device" panel 452, upon the clicking of which by the user "Add Device" panel 454 is displayed. Also upon the clicking of the "+" button, a search of devices is triggered. After the system obtains the search result including Device B and Device C, Device B and Device C are displayed in the "Add Device" panel 454, with respective annotation as "unmatched" to indicate that Device B and Device C are not yet connected to the system for which user interface 450 is configured.

Figure 5:
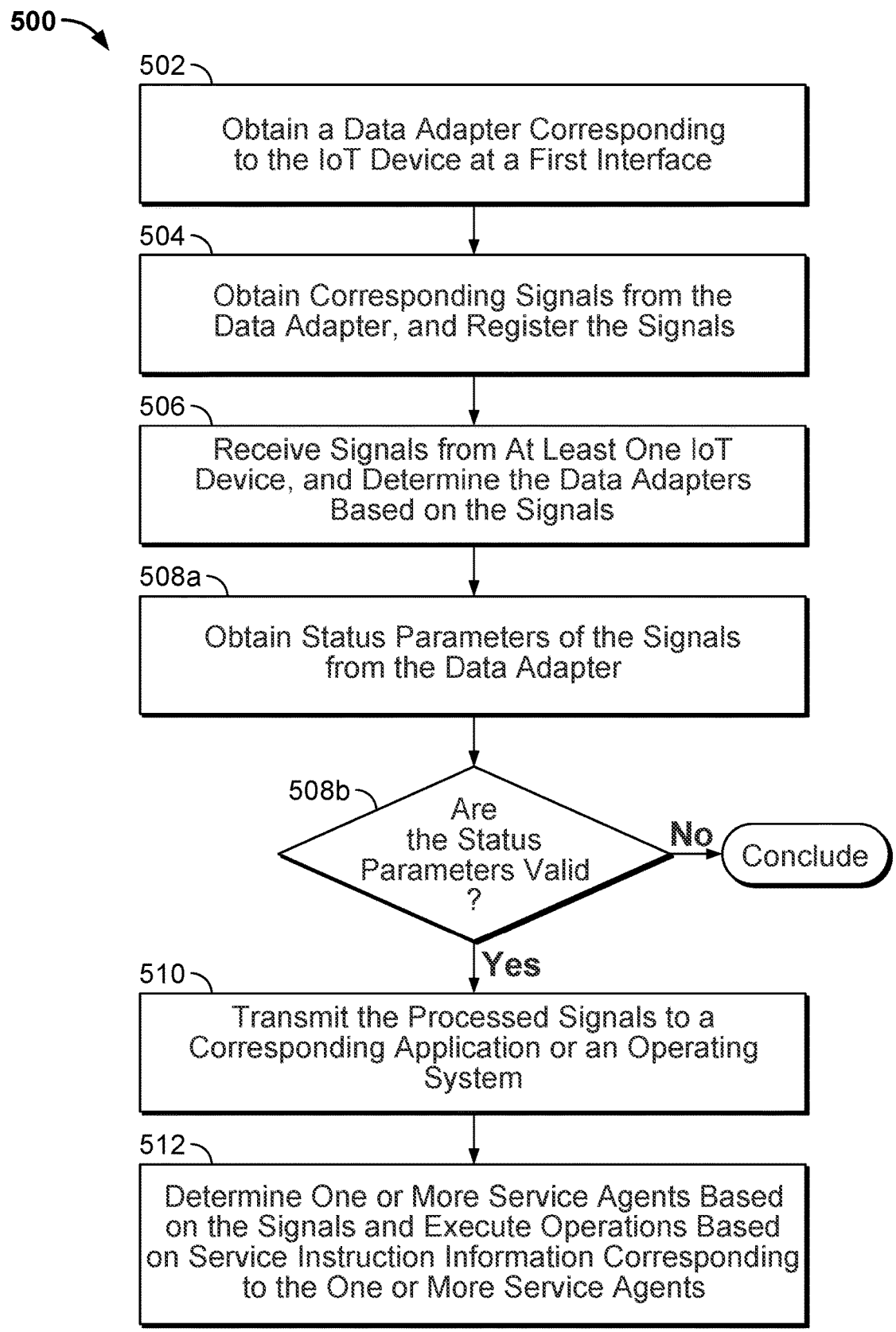
FIG. 5 is a flowchart illustrating an example process for signal processing, in accordance with one or more embodiments of the present disclosure.

FIG. 5 illustrates a flowchart of an example process for signal processing, in accordance with an embodiment of the present disclosure. Process 500 can be implemented by, for example, system 100 of FIG. 1.

Process 500 starts at 502 where at least one data adapter for an IoT device is obtained at a first interface.

At 504, corresponding signals are obtained from the at least one data adapter, and the signals are registered.

At least one data adapter (e.g., a dynamic library) corresponding to the IoT device is obtained at a first interface based on different types of signals, different device information of the IoT device, different device processing capability, and the like. A dynamic library is configured to correspond to service contexts involving the IoT device based on the signals generated at the IoT device. Signals corresponding to a context are determined based on the data adapters, and then registered with the corresponding IoT operating system.

At 506, signals from at least one IoT device are received, and data adapters are determined according to the signals.

At 508a, status parameters of the signals are obtained from the data adapters, and at 508b, the validity of the obtained status parameters are assessed.

After being generated at an IoT device, the signals are transmitted to an IoT operating system such that the IoT operating system receives signals from at least one IoT device. Next, the IoT operating system obtains the status parameters, e.g., statuses and corresponding status values, pertaining to the signals from the data adapters. Then, the validity of these status parameters, e.g., the validity of the corresponding status values, are determined. For example, the validity of a status value can be expressed as whether the status values are the ones required by the service contexts. If it is determined that the status parameters are valid, process 500 continues to 510. Otherwise, process 500 concludes, and the signals are ignored and not processed by process 500.

In some embodiments, the processing of the signals based on the data adapters includes: determining the signals that need to be converted such that to determine data adapters according to the determined signals, mapping the signals that need to be converted based on the data adapters to generate recognizable signals.

In implementation, due to the variety of the types of IoT devices, direct communications between different IoT devices and direct communications between an IoT device and the IoT operating system may not be practical. In particular, due to the difference in the types of IoT devices, the difference in the communication protocols, and the difference in the processing functionalities at IoT devices, the IoT operating system may not be configured to recognize the signals from an IoT device. Therefore, signals can also be translated into the ones recognizable by the IoT operating system such that the IoT operating system can detect contexts and provide service under the contexts.

Thus, it is first determined whether the received signals are to be converted. Then, by use of the data adapters, a mapping relationship is determined, based on which the signals are mapped into signals recognizable by the IoT operating system. Again, the status values of these service signals are obtained to determine the validity of the signals. In implementations, either 508a or 508b, or the above-described mapping and conversion of the signals, or both can be executed, as appropriated under difference conditions.

At 510, the processed signals are transmitted to a corresponding application or a corresponding operating system.

At 512, one or more service agents are determined based on the transmitted signals, and operations corresponding to the service instruction information of the one or more service agents are executed.

After being processed by the data adapters, the processed signals are transmitted to an application or an operating system such that corresponding processing operations are executed by the applications or the operating system. When an application is deployed at a terminal device, corresponding to an IoT operating system, to monitor signals and to execute the processing of the signals, the IoT operating system transmits the signals to the application after processing the signals. Then, the corresponding service agents are determined based on the received signals. Next, it is determined whether the service conditions associated with the service agents have been met. Processing components (e.g., Actuator Provider) obtain service instruction information from the determined service agents, i.e., service agents whose service conditions have been met. In some embodiments, the service instruction information is determined based on the service conditions that have been met, and the corresponding service operations are executed. In some embodiments, service instruction information includes, for example, service identifying information and service operation information. Service identifying information is configured to identify the types of a service (or a service function). A service identifying information can correspond to, for example, service data such as the location at which the service is provided. Service operation information is configured to designate the operational information of a service (or a service function), such as the operations to be executed in response to the service conditions being met. Service instruction information further comprises, for example, service parameters. Service parameters are configured to designate the operational parameters, attribute information, etc. of a service (or a service function).

In some embodiments, the execution of the operations corresponding to the service instruction information comprises at least, for example, obtaining service identifying information from the service instruction information such as to acquire the data corresponding to the service identifying information, obtaining service operation information from the service instruction information, executing the service operations corresponding to the service operation information, obtaining service parameters from the service instruction information, and applying the data corresponding to the service parameters.

In some other embodiments, when a service agent is used at a terminal device, corresponding to an IoT operating system, to handle the contexts, the IoT operating system transmits the signals to a system (e.g., an operating system) of the terminal device after processing the signals. The operating system of the terminal device is configured to maintain a table or a configuration file to record the corresponding relationship between the service agents and the signals required by the service agents. One or more signals are monitored at the one or more signal sources, and signal components (e.g., Signal Provider) of the operating system of the terminal device search the above-described table or configuration file to obtain a service agent having a corresponding relationship with the signal. In other words, Signal Provider obtains service agents matching the signal. Signal Provider obtains corresponding service conditions from the service agent to determine whether the service conditions have been met, the result of which indicates whether a context has occurred. In some embodiments, the service conditions are specified according to various contexts. Next, the service instruction information is obtained from the service agent whose service conditions have been met, and the operations corresponding to the service instruction information are executed.

In some embodiments, the operating system or the system of a terminal device is configured with a service that comprises components of Agent Engine, Signal Provider, and Actuator Provider. Agent engine is configured to receive service agents transmitted from applications, Signal Provider is configured to monitor and to detect signals, and Actuator Provider is configured to execute corresponding context-aware services.

Thus, compared to the conventional ways of allowing terminal devices to access various IoT devices and objects, with various embodiments of the present disclosure, IoT devices can be connected more efficiently, and consequently contexts corresponding to the IoT devices can be detected more efficiently and accurately. As a result, user experience and satisfaction is enhanced in terms of configuring, controlling, managing, and operating IoT devices from their terminal devices.

As an IoT operating system provides contexts based on IoT devices with a uniformed access platform, a developer who wishes to utilize signals from IoT devices can use platform-defined interfaces to implement the corresponding signal components (Signal Provider). Signal Provider is configured to monitor and detect signals such as to provide the signals to upper level applications. Therefore, developers of upper level applications can obtain signals and program processing components to execute context-based services. In some embodiments, signals corresponding to contexts can be compiled or coded into data adapters, such as dynamic libraries. With such data adapters loaded into the system, signals according to various IoT devices and various contexts can be obtained through the data adapters so as to facilitate the execution of various context-based services.

An interface for an example signal component is shown in Table 7.

TABLE 7

| Interface | Description/Specification |
| --- | --- |
| AE_SIGNAL_PROVIDER_INIT | Signal Provider initialization operation macro definition |
| registerSignal | Action of registering signal |
| unregisterSignal | Unregisters signal |
| isValidKey | For assessing validity of status condition value |
| getSignal | Acquires snapshot of signal's current status |

A signal component can correspond to manifest information, an example of which is as shown in Table 8.

TABLE 8

| Keyword (Key) | Type | Explanation/Specification |
| --- | --- | --- |
| name | String | Signal Provider |
| | | Name of compiled data adapter |
| uri | String | Signal URI definition |
| version_code | UInt | Signal Provider version number (e.g., 20161123) |
| version | String | Version number (e.g., 1.0.0) |
| permission | String | Permission definition |

Accordingly, based on signals analyzed by the data adapters, signal components can be used to process the signals. In implementation, signal providers can be managed and configured in the format of manifest files, which specify, at installation, permissions for a provider or adapter to access protected system resources such as network, camera, sensors, SMS, etc. Alternatively, similar permissions can be specified at run time using marshmallow API. With the ability to process signals from IoT devices, various contexts are detected and serviced accordingly.

In some embodiments, signals obtained from their respective data adapters are unregistered with the system. For example, a data adapter can be configured to manage signals in addition to unregistering the signals. Once it is known that a particular context-based service is no longer needed, the signals corresponding to the particular contexts are unregistered with the IoT operating system. Once a signal is unregistered, its corresponding services will not be detected or provided, regardless of whether or not the signal is received. With this, a user is enabled to add or delete context-based services as appropriate to suit different needs, at any time.

In some embodiments, IoT devices can be treated as modular blocks, in the sense that they are capable of being connected to an IoT operating system in a standardized access mode and procedures, and are configured to furnish signals to corresponding applications. In other words, the functionality of contexts detection is provided in standardized programming models to applications, which rely on such standardized programming models and unified interfaces to access the context detection capabilities of various IoT devices.

In various embodiments of the present disclosure, terminal devices include various devices such as smartphones, tablets, smart appliances capable of collecting and processing data, and the like. For example, a terminal device can be configured with multimedia functionalities such as to support applications or services involving audio, video, and data, etc. A terminal device, such as a lighting system, can also be configured to transmit or receive signals as well as to store or process signals. In some embodiments, a terminal device includes, for example, a smart phone, a tablet, a wearable device, a smart wearable device, or other smart mobile terminal devices. A terminal device can also include an IoT device or an in-vehicle device, such as a smart television, a smart router, a door security system, a lighting system, or household appliances such as a smart refrigerator, a smart oven, a smart rice cooker, or other smart kitchen appliances, etc. A terminal device can be configured with, for example, various operating systems, various smart operating systems, such as IOS, Android, and YunOS, etc.

In some embodiments, the present disclosure can be applied to the IoT technology. An IoT network, as a large-scale network, aggregates a network (e.g., the Internet) with various information sensing devices (e.g., RFID devices, infrared sensors, global positioning (GPS) systems, and laser scanners, etc.) and service providing devices. One of the objectives of an IoT network is to achieve ubiquitous connectivity over all devices and appliances with the Internet to facilitate identification and management thereof. In the age of ubiquitous connectivity, the types of user devices or terminal devices are becoming more and more diverse. For example, a user device or terminal device includes a device with a screen, a device without a screen, a household device, a wearable device, and so on. According to various embodiments of the present disclosure, an infrastructure of context engines is provided at the system level for the purposes of detecting contexts and providing services in response to the detected contexts. With this, various devices are inter-connected and various services are bundled to provide users with services in an active and automated manner.

With the afore-described processes for providing services, upon the detecting of signals, the corresponding service context is detected accordingly and the corresponding services are provided in response to the context. In particular, by use of a service architecture or service system model, as described with reference to FIGS. 6A-7H, to monitor signals and to provide services in response to the signals, corresponding context can be detected for a user, and corresponding services are provided to the user automatically at the system level. Such systems include, for example, the IOS, Android, and YunOS systems.

After service agents are developed, by use of applications and/or the operating system, automated context-aware services can be provided based on the afore-described infrastructure architecture. For example, a service agent is determined after a signal is received, and the service instruction information corresponding to the signal is accordingly determined as well. Further, the processing logic corresponding to the service instruction information is determined and the corresponding operations are executed.

Figure 6A:
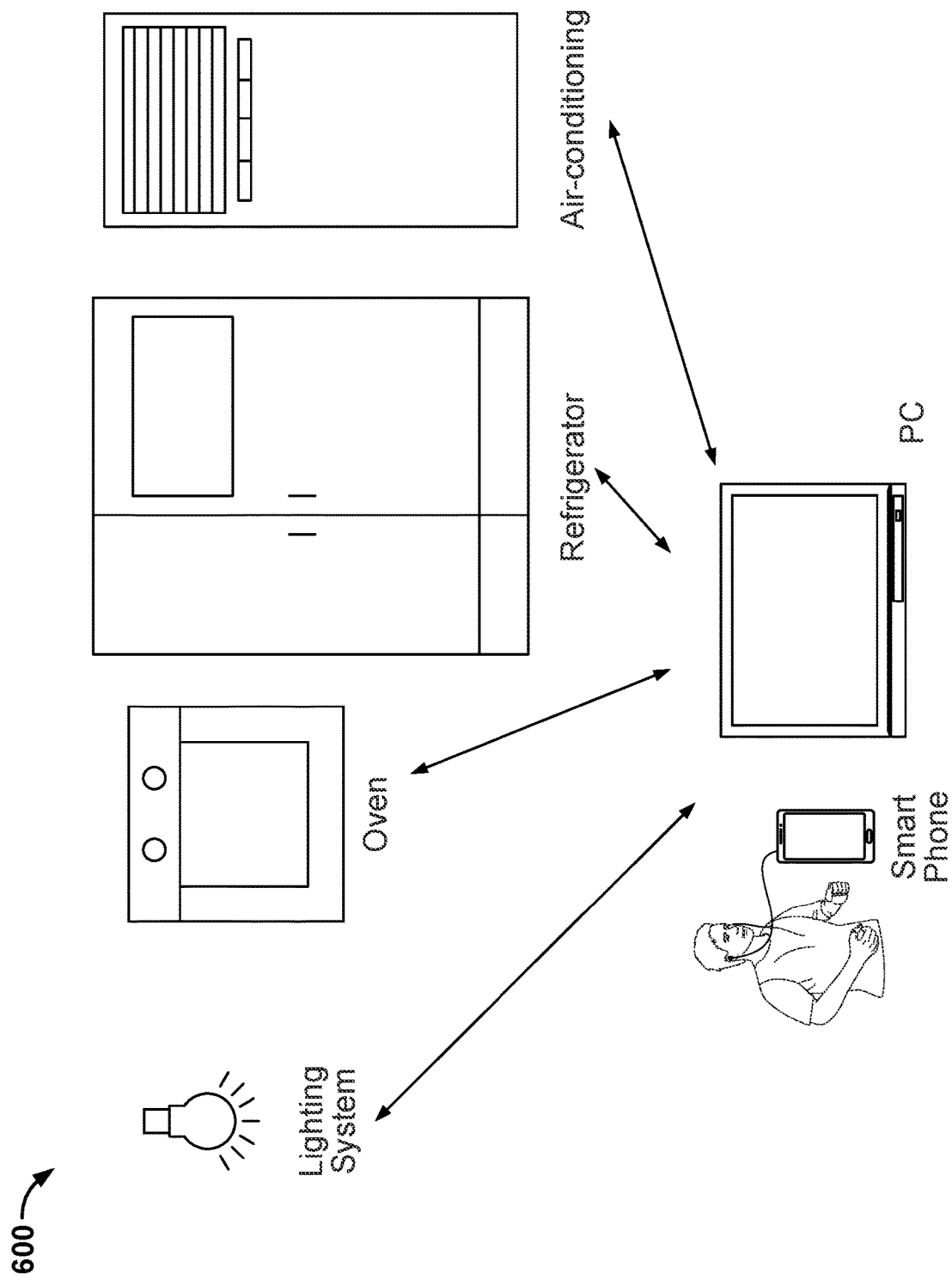
FIG. 6A is a schematic diagram illustrating an example service providing system, in accordance with one or more embodiments of the present disclosure.

FIG. 6A illustrates a schematic diagram of an example service providing system, in accordance with an embodiment of the present disclosure. System 600 can be configured to include context-detecting and processing devices (or platforms), such as mobile phones, tablets, wearable devices, other mobile devices, and the like. System 600 can also be configured to include IoT devices such as a smart refrigerator, a smart oven, a smart air-conditioning system, a smart lighting system, and the like. Therefore, with IoT devices connected to an IoT operating system, signals from IoT devices can be processed accordingly. Further, terminal devices such as mobile phones, tablets, etc. can be configured with connectivity to the IoT operating system or network such as to establish a connection with at least one IoT device on the system. Then, the operating system obtains the data adapters for the contexts corresponding to the IoT devices. With the data adapters, signals are adapted for the execution of the logic processing. One data adapter can be configured to adapt to one or more signals. At such data adapters, signals can be registered, canceled (unregistered), or subjected to logic processing, etc. Therefore, after an IoT device generates or obtains a signal, the signal is sent to a service platform such as an operating system. The corresponding service platform receives the signal, and uses a data adapter to analyze the signal. Accordingly, a context corresponding to the received signal is detected, and the corresponding service operations are executed to provide the user with the corresponding context-aware service. In particular, after the signal is processed at a data adapter, the processed signal is sent to an application or an operating system such that the application or the operating system can determine the corresponding service agent based on the signal, and subsequently execute the corresponding operations according to the service agent.

For example, a mobile phone operating system receives a temperature signal, which indicates that current temperature is over 30°. Based on this signal, a service agent, whose service conditions are met by the current temperature being over 30°, is determined. Next, based on the service instruction information obtained from the determined service agent, a home air-conditioning system is turned on. In another example, an operating system receives a security signal, which indicates that nobody is at home and the door is locked. Using this security signal, a lighting control agent is determined as the service agent to be executed. Next, the service instruction information is obtained from the lighting control agent, and the lights and other such household appliances are turned off according to the determined service instruction information, preventing the home resources from being wasted.

In some embodiments, signals include IoT device signals. Accordingly, the processing of the signals based on the data adapters and the transmitting of the processed signals comprise: determining one or more dynamic libraries corresponding to the IoT device signals; analyzing the IoT device signals using the one or more dynamic libraries to obtain processed IoT device signals; and sending the processed IoT device signals via a second interface to an operating system. In some embodiments, the operating system further determines service agents based on the processed IoT device signals, and controls the IoT devices or other terminal devices corresponding to the operating system, based on the service instruction information from the service agents.

In some embodiments, the signals comprise temperature signals. Accordingly, the processing of the signals based on the data adapters and the transmitting of the processed signals comprises: determining one or more dynamic libraries corresponding to the temperature signals; analyzing the temperature signals using the one or more dynamic libraries to obtain processed temperature signals; sending the processed temperature signals via a second interface to an operating system. In some embodiments, the operating system further determines service agents based on the processed temperature signals, and controls the IoT devices or other terminal devices corresponding to the operating system, based on the service instruction information from the service agents.

IoT devices, such as an air-conditioner, a refrigerator, and the like, obtain temperature signals through, for example, temperature sensors and send the temperature signals to an IoT operating system. The IoT operating system receives the temperature signals and matches the temperature signals to a dynamic library. The matched dynamic library is used to analyze the temperature signals to obtain processed signals. For example, temperature signals can be analyzed to be converted into signals recognizable by the operating system and applications. The processed temperature signals are sent via a second interface to the operating system. In turn, the operating system determines one or more service agents based on the processed temperature signals, and controls IoT devices based on the service instruction information of the one or more service agents. For example, such controlling can be configured to change the temperature settings of the air conditioner or the refrigerator, or to turn on a humidifier.

In some embodiments, the signals comprise exercise-related signals including motion signals, biological signals, biometric signals, and the like. Accordingly, the processing of the signals based on the data adapters and the transmitting of the processed signals comprise: determining one or more dynamic libraries corresponding to the exercise-related signals; analyzing the exercise-related signals using the one or more dynamic libraries to obtain processed exercise-related signals; and sending the processed exercise-related signals via a second interface to an operating system. In some embodiments, the operating system further determines service agents based on the processed exercise-related signals, and controls the IoT devices or other terminal devices corresponding to the operating system, based on the service instruction information from the service agents.

Fitness equipment, wearable devices, and other IoT devices can be configured to obtain exercise-related signals through, for example, gravity sensors, acceleration sensors, positioning sensors, heartbeat rate sensors, and the like, and send the exercise-related signals to an IoT operating system. The IoT operating system receives the exercise-related signals and matches the exercise-related signals to a dynamic library. The matched dynamic library is used to analyze the exercise-related signals to obtain processed signals. For example, exercise-related signals can be analyzed to be converted into signals recognizable by the operating system and applications. The processed exercise-related signals are sent via a second interface to the operating system. In turn, the operating system determines one or more service agents based on the processed exercise-related signals, and controls IoT devices based on the service instruction information of the one or more service agents. For example, such controlling can be configured to change the workout settings of a fitness equipment, e.g., the speed of a treadmill. For another example, the service instruction information can be configured to turn on an on-demand water-heater at home after detecting the user is done with workouts. For yet another example, the service instruction information based on the service agent can be sent to a terminal device corresponding to the operating system, causing a smart phone to display an alert to the user.

In an example where devices correspond to an environment of an operating system, a context engine infrastructure and context-aware service development framework can be built at a level such as the operating system level. In particular, context detecting is provided at the system level, a reactive programming model can be provided on top of a dynamic language (e.g., JavaScript), and a universal protocol is used to interface various devices such as IoT devices.

Figure 6B:
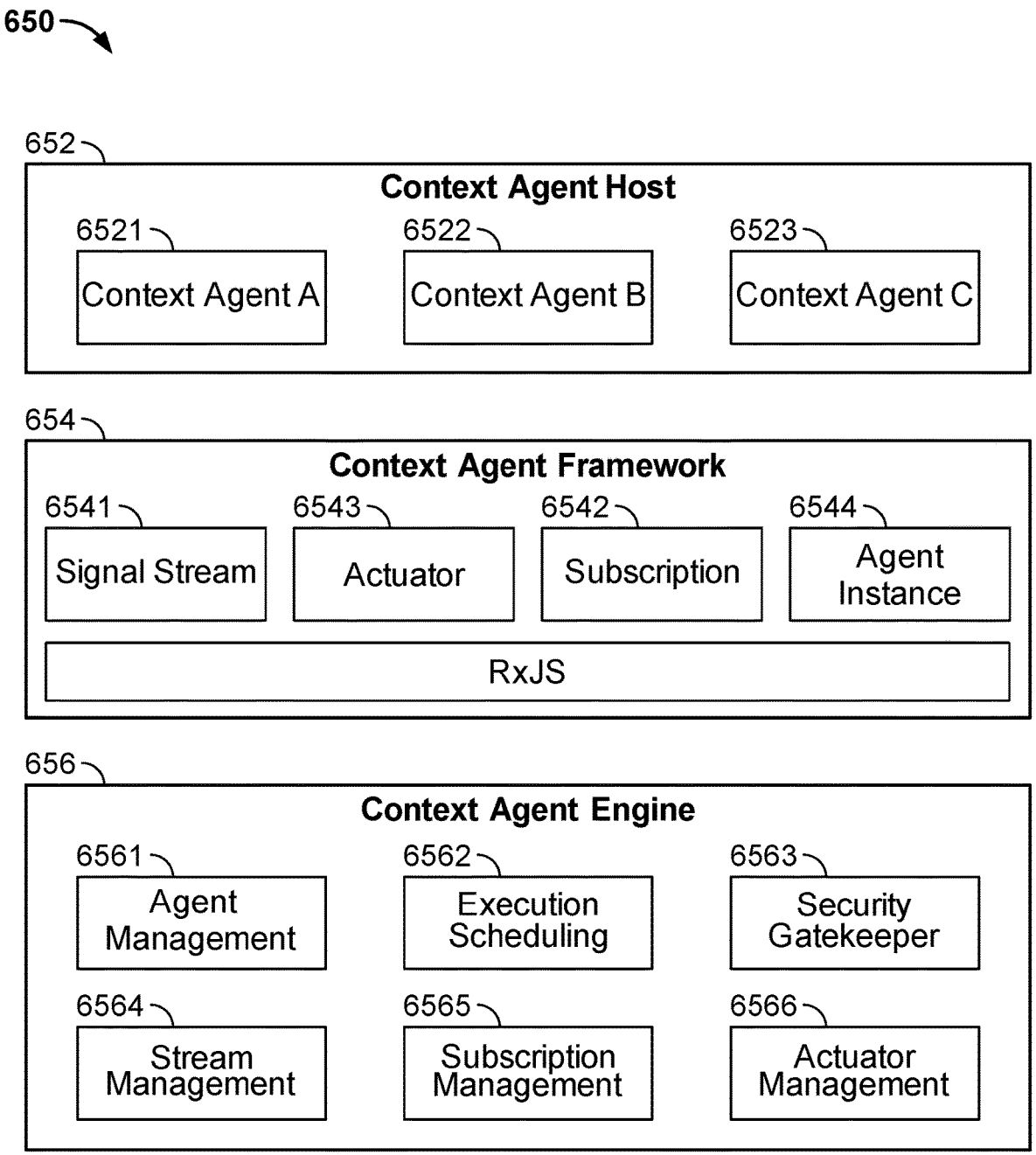
FIG. 6B is a block diagram illustrating an example system model for service providing, in accordance with one or more embodiments of the present disclosure.

FIG. 6B illustrates a block diagram of an example system model for providing services, in accordance with an embodiment of the present disclosure. System model 650 includes three modules: a Context Agent Host 652, a Context Agent Framework 654, and a Context Agent Engine 656. The relationships amongst these three modules are described in further details with reference to FIG. 7A. In general, Context Agent Engine 656 is configured to manage Context Agent Host 652, which relies on Context Agent Framework 654.

In particular, Context Agent Host 652, as used herein, refers to an application container capable of detecting contexts. It can, for example, inherit from a most base unit of applications (a base object class of a service component (Page)). A developer can use Context Agent Host to 652 to program a context-aware application to be executed as an application in a system. As shown here in FIG. 6B, Context Agent Host 652 includes context-aware applications such as Context Agent A 6521, Context Agent B 6522, and Context Agent C 6523.

Context Agent Framework 654, as used herein, refers to a framework of applications utilizing context engines. It is through this framework that components at lower system levels are configured to provide components at upper system levels such as Context Agent Host 652 with the capability of context detecting and context-based service providing. In this example, Context Agent Framework 654 includes components of Signal Stream 6541, Subscription 6542, Actuator 6543, and Agent Instance 6544. Each of these components is configured to utilize a dynamic programming language such as Javascript supported by, for example, a reactiveX library of Javascript (RxJS), to handle the processing logic corresponding to a context.

Context Agent Engine 656, as used herein, refers to a system service of a context engine. It can be implemented as, for example, a stand-alone independent service embedded in (e.g., that is a part of) the system, responsible for managing context-aware applications such as Context Agent Host 652. In this example as shown herein, Context Agent Engine 656 includes components of Agent Management 6561, Execution Scheduling 6562, Security Gatekeeper 6563, Stream Management 6564, Subscription Management 6565, and Actuator Management 6566. Context Agent Engine 656 manages Context Agent Host 652 by using afore-mentioned components, the details of which are illustrated with reference to FIGS. 7D-7E and 7G-7H.

Figure 7A:
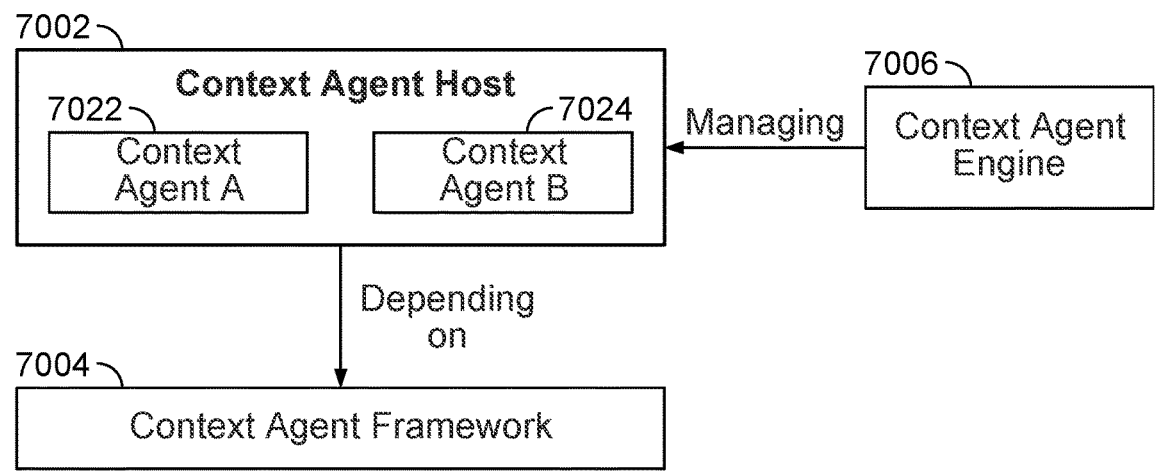
FIG. 7A is a relational diagram illustrating components of an example system model for service providing, in accordance with one or more embodiments of the present disclosure.

FIG. 7A illustrates a relational block diagram of an example system model for service providing, in accordance with an embodiment of the present disclosure. As shown herein, Context Agent Host 7002, which includes instances of Context Agent A 7022 and Context Agent B 7024, depends from Context Agent Framework 7004 for inheritance of its functionalities. Context Agent Host 7002 is also managed by Context Agent Engine 7006, the details of which are illustrated with reference to FIG. 7E.

Figure 7B:
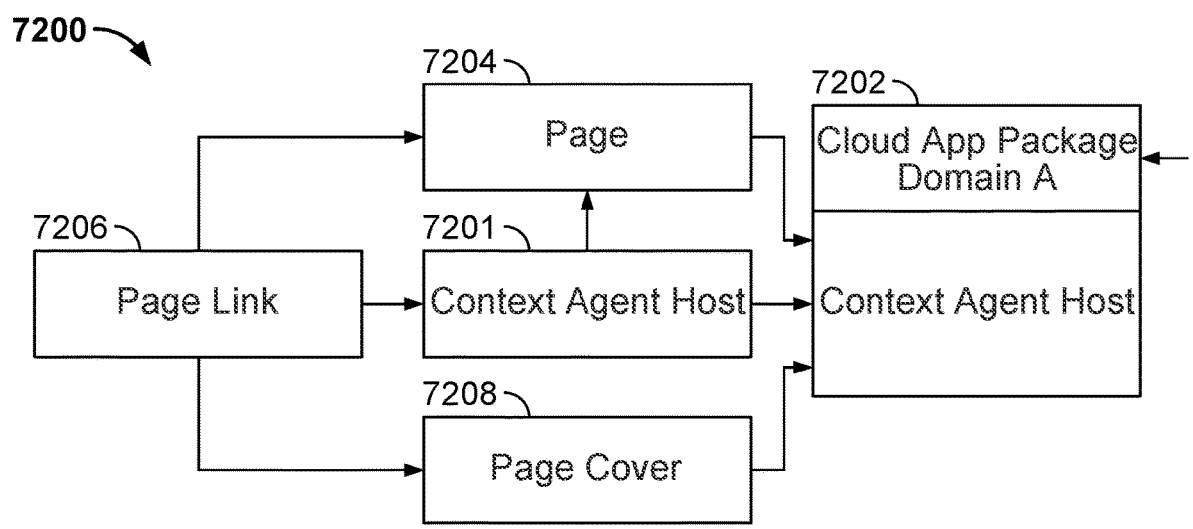
FIG. 7B is a schematic diagram illustrating an example service providing application developed according to system model 650 of FIG. 6B, in accordance with one or more embodiments of the present disclosure.

FIG. 7B illustrates a block diagram of an example service providing application developed according to system model 650 of FIG. 6B, in accordance with an embodiment of the present disclosure. As shown, a context-aware application 7200 is developed using Javascript or other object-oriented language and comprises components of a Cloud App Package 7202, a Page 7204, a Page Link 7206, and an optional Page Cover 7208.

A developer builds context-aware applications derived from Context Agent Host 7201. Such a context-aware application can be presented in the form of, for example, a Cloud App Package 7202, which is a complete application package (e.g., a set of Javascript files that can be executed on its own) that performs operations under various contexts. In some embodiments, a Cloud App Package is identified by domain names.

Page 7204 is the unit (e.g., the base object class) of an application at the highest parent level. In other words, Page 7204 is the most base level application unit from which an application is derived. In this example, Context Agent Host 7201 inherits from Page 7204 the functionalities of detecting context and providing context-aware service.

Page Cover 7208 is a visualization component configured to provide the context-aware application with a user interface, which is configured to allow for interactions between a user and a device.

Page Link 7206 is a protocol for inter-app communication. Page Link 7206 can be used to invoke a context-aware application or to communicate with other applications. Page Link 7206 can be implemented using mechanisms such as the intents mechanism or the services mechanism.

In particular, after an application package is downloaded and installed locally on a terminal device, upon a context being detected, the context-aware application is launched to provide the corresponding services. Moreover, a user can control the context-aware services by engaging a human-machine interface provided by the package, for example, starting or stopping a context-aware service by clicking on a start button or a stop button, respectively.

Figure 7C:
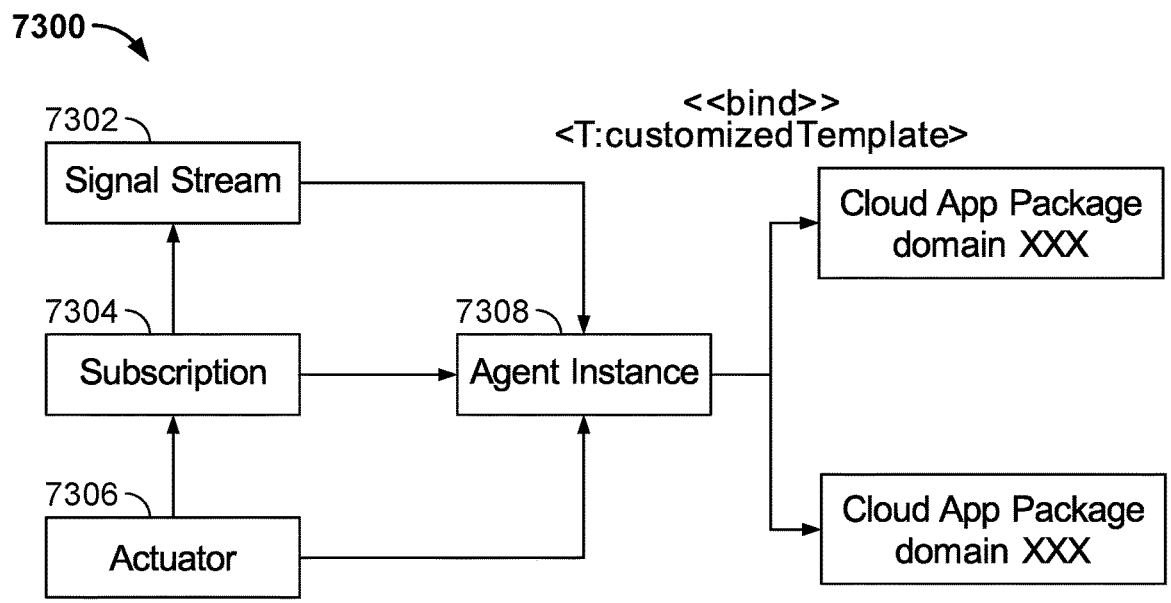
FIG. 7C is a schematic diagram illustrating various components of an example Context Agent Framework of System 650 of FIG. 6B, in accordance with one or more embodiments of the present disclosure.

FIG. 7C illustrates a schematic diagram of various components of an example Context Agent Framework of System 650 of FIG. 6B, in accordance with an embodiment of the present disclosure. As shown, Context Agent Framework 7300 comprises components of a Signal Stream 7302, a Subscription 7304, an Actuator 7306, and an Agent Instance 7308. The components can be implemented as objects using Javascript. In some embodiments, Context Agent Framework provides the upper layer (e.g., Context Agent Host or application 7200) with the capabilities to detect contexts and to provide context-based service.

Service agent or Agent as used herein refers to a logical unit corresponding to a complete context. It is by use of a service agent or an agent that a context is detected and handled according to the logic processing.

Agent Instance as used herein refers to an instance of an agent or a service agent instantiated for a particular environment and a particular device.

Signal Stream as used herein refers to a stream of signals received from sources such as I/O interfaces of various devices and systems. Through operations on the signals of the Signal Stream, applications at higher system layers are furnished with the capabilities to detect a context. Also, Agent is configured to organize processing logic components to detect contexts by using Signal Stream.

Subscription as used herein refers to a subscription relationship mapping various signals to a context. A table, a configuration file, or the like can be used to maintain the corresponding relationships. It is through Subscription that signals detected correlate to contexts determined, which in turn correlate to corresponding context-based applications.

Actuator as used herein refers to a specific executable task of a context-aware service. It is the actual service to be performed when the system detects a context and thereby carries out correspondent logical processing of the context. For example, an Actuator can be tasked to, after detecting that the weather is hot and humid, turn on the air conditioning.

Context Agent Engine is configured to manage each context-aware application, including to maintain life cycles for each application.

Figure 7D:
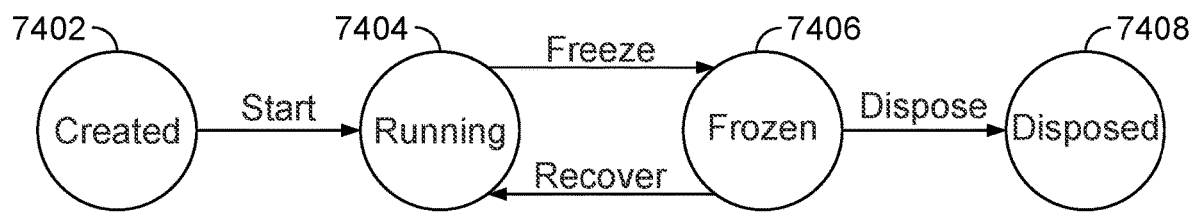
FIG. 7D is a schematic diagram illustrating an example life cycle of an example service providing application, in accordance with one or more embodiments of the present disclosure.

FIG. 7D illustrates a state diagram of an example life cycle of a service providing application, in accordance with an embodiment of the present disclosure. An application goes through a life cycle comprising the states of Created, Running, Frozen, and Disposed.

Created 7402 is the state that an application has been created, indicating that the context-aware application at this state has already been installed on the user target device.

Running 7404 is the state of execution, during which an application performs operations according to the logic set forth by Agent.

Frozen 7406 is the state of frozen operations, during which an application no longer uses system resources, or provides any context-based services. In this state, the system resources previously reserved or used by the app can either be released in entirety, in part, or not at all. However, the application can be recovered or restored back to the running state 7404, in which the application continues to be executed by Context Agent Engine.

Disposed 7408 is the state of completion and conclusion of execution. The application process ends and all resources are released.

Figure 7E:
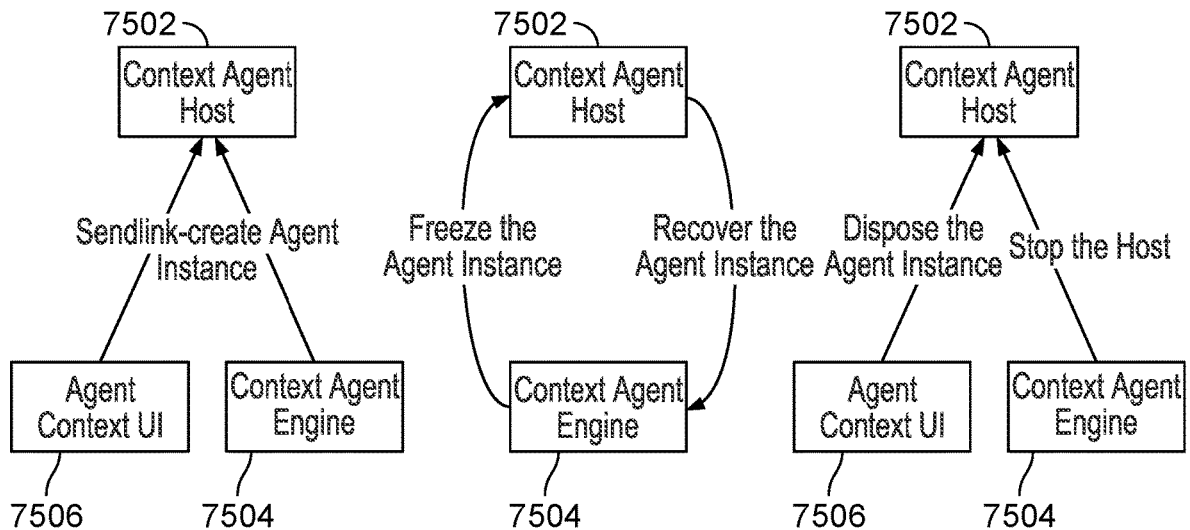
FIG. 7E is a schematic diagram illustrating an example state transition controlled by Context Agent Engine 656 of FIG. 6B, in accordance with one or more embodiments of the present disclosure.

FIG. 7E illustrates a schematic diagram of example state transitions controlled by Context Agent Engine 656 of FIG. 6B, in accordance with an embodiment of the present disclosure. In this example, first, Context Agent Host 7502 is created by use of Context Agent Engine 7504 and Agent Control UI 7506. Later, Context Agent Engine 7504 can set Context Agent Host 7502 in a frozen state and later on restores the Context Agent Host 7502 into a running state. Context Agent Engine 7504 also controls Context Agent Host 7502 to conclude its execution, and correspondingly stops Dynamic Page Manager Service (DPMS) from servicing as well. In some embodiments, DPMS, generally implemented as a service process, is used as a management service for executing Page instances. Context Agent Engine 7504 can communicate the afore-mentioned control in the form of an event to Context Agent Host 7502 using inter-process communication mechanisms such as the intent mechanism, binders mechanism, Anonymous Shared Memory mechanism, or any suitable mechanisms for inter-process communication. DPMS is described in more detail below.

Next, an example of Page management based on YunOS™ (also referred to as Aliyun OS™), a mobile operating system, is described. The technique described is also applicable to other operating systems such as IOS™, Android™, etc.

(1) Page

Page as used herein refers to a service component, abstracting local services and remote services in the form of a base unit of applications. By packaging different data and functions, a Page provides various kinds of services. In some embodiments, one context-aware service or application can include more than one Page. For example, a context-aware application can include one Page to provide a service of a UI (user interface), another for picture-taking, and/or another for a background service, such as user account authentication. A Page in execution is herein referred to as a Page instance. It is an execution entity for performing a local service or a remote service, and can be created by use of DPMS. For example, after receiving a Page Link to Page B sent by Page A, DPMS creates an instance of Page B. Page instances are also scheduled or managed by DPMS, which also maintains the life cycle of Page instances.

Each Page can be configured with a unique identifier in the YunOS. For example, a Page can be identified using a URI (Uniform Resource Identifier), which is generated by use of various suitable techniques that produce uniqueness in the identifiers. A URI functions as an address link to uniquely determine a corresponding Page. For example, to distinguish the services provided by Pages, pertinent information such as the title of a service, content of a service, delivery method of a service, provider of a service, etc. can be selectively embedded in the corresponding URIs and assigned to the Pages. In some embodiments, a Page is located at a server such as a cloud system via its respective URI, downloaded and installed onto a terminal device, and executed as an app.

Taking a calendar service provided by Company A for example, the URI assigned to the Page corresponding to the Company A's calendar service can be configured as:

Page://calendar.a.com

In the above, "Page://" is used to distinguish this address as the address corresponding to a Page and from addresses of other types such as a www site or an FTP site. "Calendar" indicates the title of the service provided at the Page, while "a" indicates the information about the service provider being company A.

Depending on the needs of a context, a Page may require the creation of multiple Page instances. To distinguish different instances of the same Page, a unique Page ID is further assigned to each Page instance for the purpose of identification. Such identifiers can be assigned when a Page instance is created. A Page instance is the executing state of a Page, i.e., the executing entity of a local or remote service. Again, the DPMS creates, schedules, and manages the life cycle of a Page instance. Likewise, a Page ID can be embedded in an information element (Page Link) and transmitted.

Figure 7F:
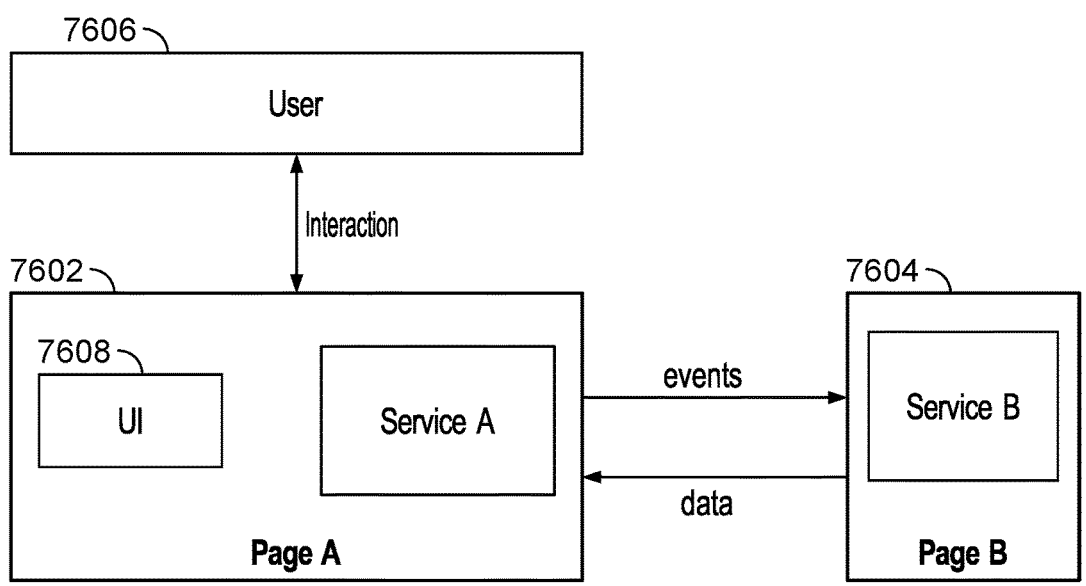
FIG. 7F is a functional block diagram illustrating an example interaction between Pages, in accordance with one or more embodiments of the present disclosure.

FIG. 7F illustrates a functional block diagram of an example interaction between Pages, in accordance with an embodiment of the present disclosure. In this example, Page A 7602 sends an event (e.g., included in a Page Link) to Page B 7604 and obtains data back from Page B 7604. Page A 7602 also interacts with a user 7606 through a UI 7608. Also as shown herein, Page A 7602 provides for Service A, and Page B 7604 provides for Service B. Page A 7602 provides to a user 7606 a display interface in the form of a UI 7608, through which Service A is displayed or delivered to the user 7606 and various inputs from the user 7606 are received. Further, Page B 7604 is configured to primarily run in the background and to provide service support for other Pages.

Further, a Page can be developed and destroyed and therefore has three states between being developed and destroyed.

Created is the state indicating that a Page has been created. After the Page is created (i.e., instantiated), it enters into the Created state.

Running is the state of execution after a Page is created. In this state, events and/or data are transmitted between Pages, and processed by respective receiving Pages.

Stopped is the state indicating that a Page is deactivated. In this state, a Page does not transmit events and/or data with other Pages.

Figure 7G:
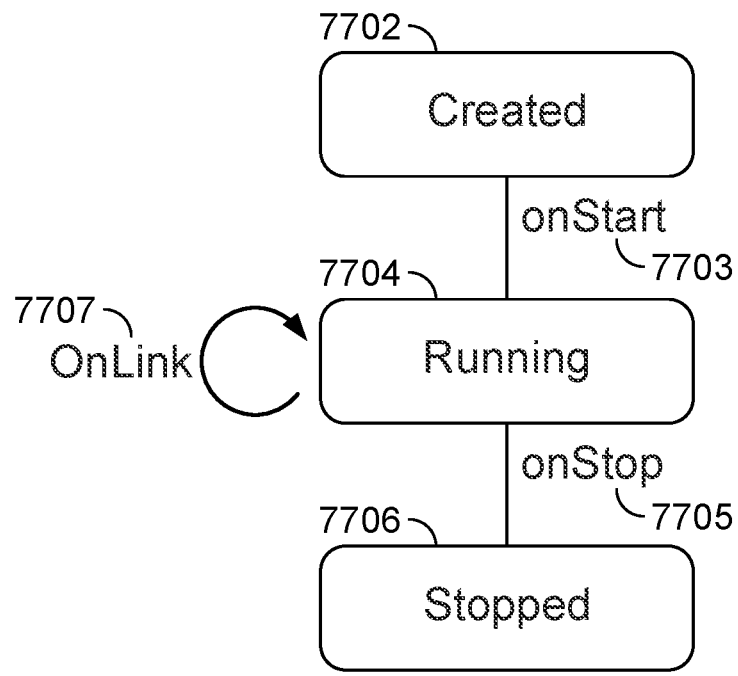
FIG. 7G is a schematic diagram illustrating an example state transitioning of a Page, in accordance with one or more embodiments of the present disclosure.

FIG. 7G illustrates an example state switching of a Page, in accordance with an embodiment of the present disclosure. A Page is capable of switching between different states described above. Also, a life event notification is received at the time of switching to configure the Page's state after switching. DPMS controls Page state switching and life event notification.

As shown herein, when a Page (not shown) receives an onStart event 7703, the Page leaves Created state 7702 and enters Running state 7704. When the Page receives an onStop event 7705, the Page leaves Running state 7704 and enters Stopped state 7706. When in Running state 7704, the Page receives Page Links sent by the other Pages via the onLink interface 7707. The onStart event 7703 is the life event notification used to instruct the Page to begin entering Running state 7704. The onStop event 7705 is the life event notification used to instruct the Page to begin entering Stopped state 7706.

Figure 7H:
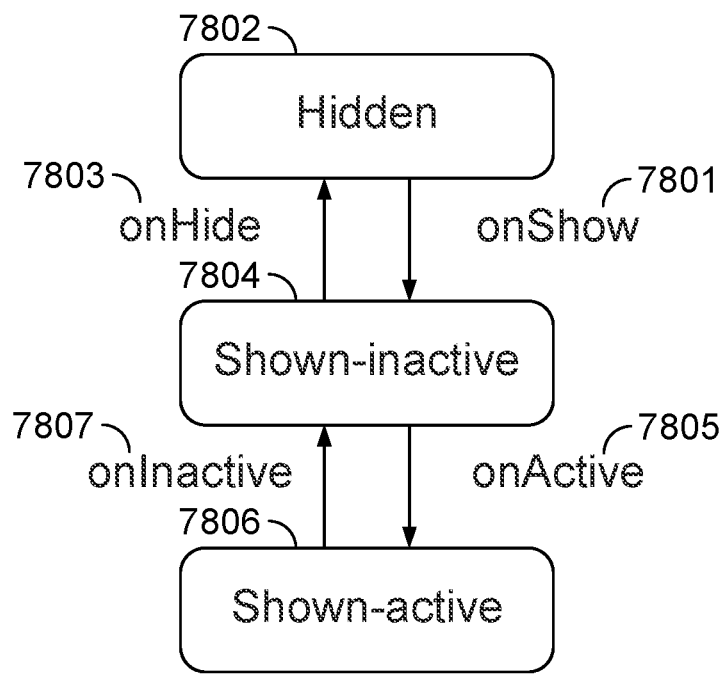
FIG. 7H is a schematic diagram illustrating another example state transitioning of a service component, in accordance with one or more embodiments of the present disclosure.

FIG. 7H illustrates another example state transitioning of a Page, in accordance with an embodiment of the present disclosure. For a Page having a UI (user interface), the running state can be in one of the following three sub-states:

Hidden is a sub-state when a page runs in the background and is not displayed to the user.

Shown-inactive (visibly non-interactive) is a sub-state when a page is displayed to the user in a mode that is not responsive to any user input.

Shown-active (visibly interactive) is a sub-state when a page is displayed to the user in a mode that is responsive to user inputs.

For example, Page A is displayed in a full-screen window; Page B is displayed in a partial-screen window. When Page B is displayed on top of Page A, Page A is in Shown-inactive sub-state, and Page B is in Shown-active sub-state.

Through life event notifications, a Page switches between different states and sub-states.

As shown here in FIG. 7H, after a Page (not shown) in Hidden sub-state 7802 receives an onShow event 7801, it enters Shown-inactive sub-state 7804. After a Page in Shown-inactive sub-state 7804 receives an onHide event 7803, it enters back to Hidden sub-state 7802. After a Page in Shown-inactive sub-state 7804 receives an onActive event 7805, it enters Shown-active sub-state 7806. After a Page in Shown-active sub-state 7806 receives an onInactive event 7807, it enters back to Shown-inactive sub-state 7804.

(2) PageLink

Page Link is an information element for transmission between Pages. Information such as, but not limited to, events, data, or the like are transmitted between Pages using Page Links. Such transmission of events and data can be implemented using a configured set of APIs (Application Programming Interfaces) according to inter-process and/or inter-thread communication protocols. Also by use of Page Links, YunOS records relationships between service components according to their communications. The URI of a target Page is configured in Page Link (e.g., stored in a configuration file), and information of events, data, and/or services can also be included in Page Link.

Pages, correlated through Page Links in a flexible manner, achieve the implementation of a variety of context-aware services.

(3) DPMS

DPMS (Dynamic Page Manager Service) as used herein refers to a system providing service component management entity. DPMS manages a Page's life cycle starting from the creation to the destruction. DPMS also manages Page's runtime scheduling, as well as inter-Page interactions via Page Links.

With the above-described service component management, a system is provided to include a service component management instance as well as N (N being an integer greater than 1) service components. Based on this system, the service component management component can be configured to receive an information entity sent by one service component directed at another service component, and to send the information entity to the second service component for processing.

With the above-described system, context-aware applications can be provided to a user according to the context.

Once Context Agents are developed, automated context-aware services based on the above-described system can be provided in accordance with embodiments of the present disclosure. In one embodiment, upon receiving a signal, a service agent is determined such that consequently service instruction information of the context-based service corresponding to the signal is determined. Next, the processing logic corresponding to the service instruction information is determined, and corresponding operations are executed at Context Agent Host to handle the context. For example, when it is detected that an oven has stopped heating, an alert context is detected such that the user is alerted with the message that the meal is temporarily not cooked and needs manual handling. After the user has finished manually handling the food and it is detected that the oven door is closed, another context is detected such that the oven is turned on again. For another example, once it is detected that the lights in the bedroom are turned on, a bedroom-in-use context is detected and the lights in the foyer area etc. can be turned off to conserve electricity.

Figure 8:
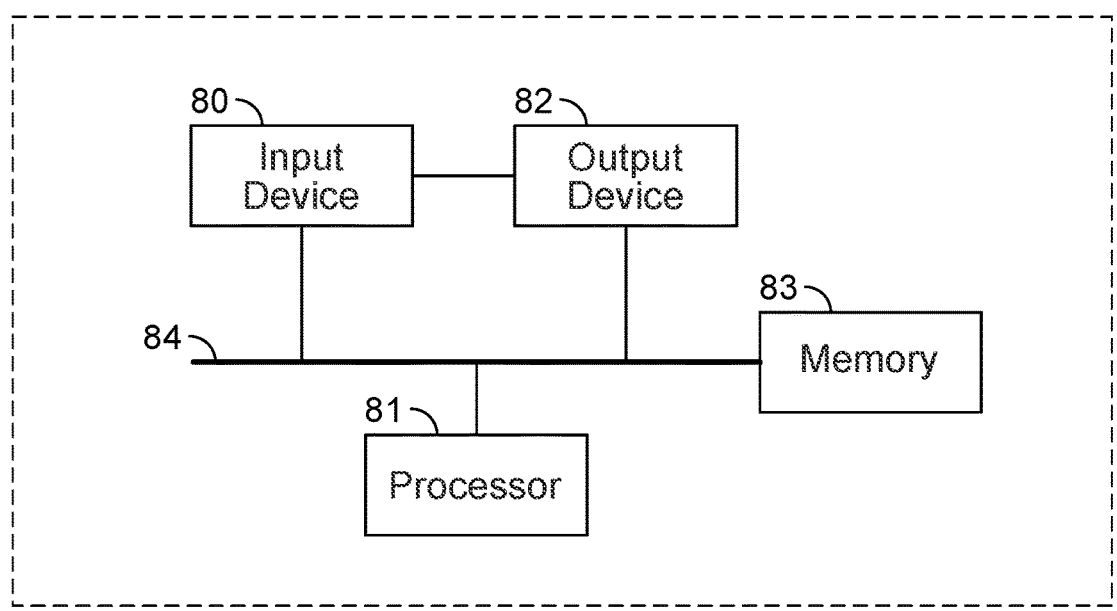
FIG. 8 is a functional diagram illustrating an embodiment of a terminal device for providing services, in accordance with one or more embodiments of the present disclosure.

FIG. 8 illustrates a functional diagram of an embodiment of a terminal device, in accordance with an embodiment of the present disclosure. Device 800 can be a standalone device, an integrated in-vehicle sub-system of a vehicle (e.g., an automobile, an aircraft, a ship, etc.), or a standalone in-vehicle system. Device 800 can be used to implement processes and systems of FIGS. 1-7H, as appropriate. As will be apparent, other device architectures and configurations can be used to implement the systems and methods for device connecting and service providing. Device 800 includes a processor 81, an output device 82, an input device 80, memory 83, and at least one communication bus 84.

Communication bus 84 is for implementing inter-component communication connections. Memory 83 may contain high-speed RAM memory, or non-volatile memory (NVM), such as at least one magnetic disk storage device. Memory 83 stores various programs used to instruct various processes to be executed by computing device 800.

Optionally, processor 81 can be implemented as a central processing unit (CPU), an application-specific integrated circuit (ASIC), a digital signal processor (DSP), a digital signal processing device (DSPD), a programmable logic device (PLD), a field-programmable gate array (FPGA), a controller, a microcontroller, a microprocessor, or another electronic component. Processor 81 is configured to couple to input device 80 and output device 82 through a wired or wireless connection.

Optionally, device 800 may comprise multiple input devices. For example, it could comprise at least one of the following: a user-oriented user interface, a device-oriented device interface, a software programmable interface, a camera, a sensor, a transceiver, and the like. Optionally, the device-oriented device interface may be a wired interface for conducting device-to-device data transmissions, or it could be a hardware connection interface (e.g., a USB interface or a serial port) for conducting device-to-device data transmissions. Optionally, the user-oriented user interface could, for example, be user-oriented control keys, a speech input device for receiving speech input, or a touchscreen perceiving device (such as a touchscreen or a touch tablet having touch-sensing functions). Optionally, the programmable interface of the software described above could be a portal, such as a chip input pin interface or output interface, through which the user edits or modifies the program. Optionally, the transceiver described above could be a radio-frequency transceiver chip, a baseband chip, or a transceiver antenna. A microphone or other audio input device can receive speech data. Output device 82 may include a display device, sound equipment, and other output devices.

In some embodiments, processor 81 of the terminal device 800 comprises functions for executing all modules in the data-processing means in each device. For specific functions and technical results, refer to the embodiments described above. They will not be discussed further here.

Figure 9:
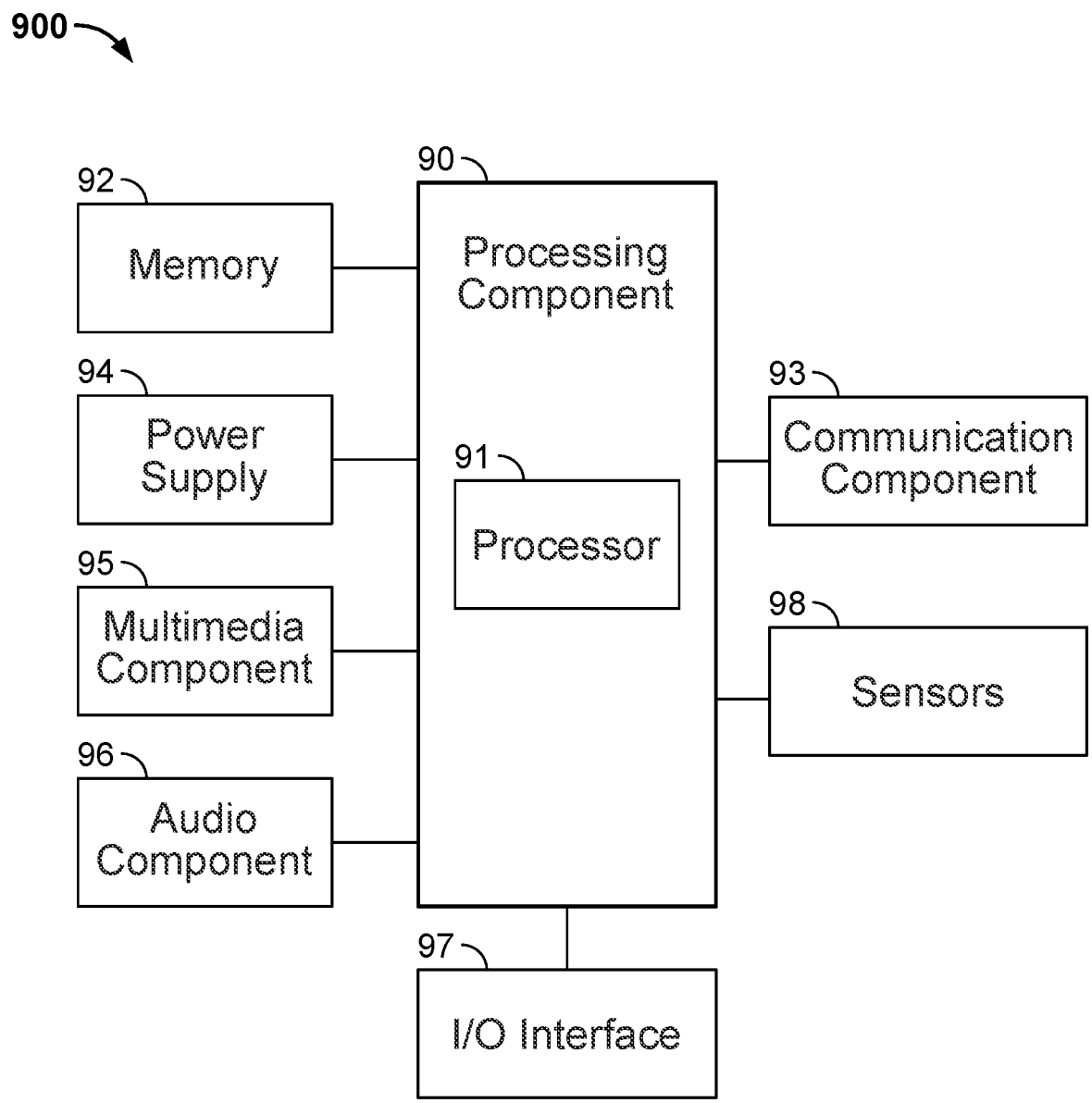
FIG. 9 is a functional diagram illustrating an embodiment of a programmed computer system for providing services, in accordance with one or more embodiments of the present disclosure.

FIG. 9 illustrates a functional block diagram of an embodiment of a programmed computer system, in accordance with an embodiment of the present disclosure. Computing system 900 can be used to implement the systems and processes of FIGS. 1-7H, as appropriate. As will be apparent, other computer system architectures and configurations can be used to implement the systems and methods for providing services. Computing system 900, which includes various subsystems as described below, includes a processor 91 and a memory 92. Processor 91 executes the computer code stored in memory 92 to implement the above-described processes and systems of FIGS. 1-7H. For example, processor 91 can be implemented by a single-chip processor or by multiple processors. In some embodiments, processor 91 is a general purpose digital processor that controls the operation of the computer system 800. Using instructions retrieved from memory 92, processor 91 controls the reception and manipulation of input data, and the output and display of data on output devices (e.g., display). In particular, processor 91 is coupled bi-directionally with memory 92, which can include a first primary storage area, typically a random access memory (RAM), and a second primary storage area, typically a read-only memory (ROM). Primary storage can be used as a general storage area and as scratch-pad memory, and can also be used to store input data and processed data. Primary storage can also store programming instructions and data, in the form of data objects and text objects, in addition to other data and instructions for processes operating on processor 91. Primary storage typically includes basic operating instructions, program code, data, and objects used by the processor 91 to perform its functions (e.g., programmed instructions). For example, memory 92 can include any suitable computer readable storage media, described below, depending on whether, for example, data access needs to be bi-directional or uni-directional. For example, processor 91 can also directly and very rapidly retrieve and store frequently needed data in a cache memory (not shown). Memory 92 can also be configured to store data such as messages, pictures, and video, etc.

Optionally, processor 91 is set up in a processing component. Computing system 900 may further comprise: a communication component 93, a power supply component 94, a multimedia component 95, an audio component 96, an I/O interface 97, and/or a sensor component 98. The components specifically contained within computing system 900 are set according to need. The present embodiment imposes no limitations with regard to them.

Processing component 90 generally controls the overall operations of the terminal device. Processing component 90 can comprise one or more processors 91 for executing instructions so as to complete all or some of the steps of the method described above with regard to FIGS. 1 through 5. In addition, processing component 90 may comprise one or more modules to facilitate interaction between processing component 90 and other components. For example, processing component 90 may comprise a multimedia module to facilitate interaction between multimedia component 95 and the processing component 90.

Power supply component 94 provides electric power to the various components of computing system 900. Power supply 94 can include a power supply management system, one or more power supplies, and other components related to generating, managing, and allocating power to the terminal device.

Multimedia component 95 comprises an output interface display screen provided between computing system 900 and the user. In some embodiments, the display screen may comprise a liquid crystal display (LCD) or a touch panel (TP). If the display screen comprises a touch panel, the display screen may be implemented as a touchscreen to receive input signals from the user. The touch panel comprises one or more touch sensors to detect touches, sliding actions, and gestures on the touch panel. Said touch sensor can not only detect the boundaries of touch or slide actions, but also can measure duration and pressure related to said touch or slide operations.

Audio component 96 is configured to output and/or input audio signals. For example, the audio component 96 includes a microphone (MIC). When computing system 900 is in an operating mode, e.g., speech recognition mode, the microphone is configured to receive external audio signals. The received audio signals can be further stored in storage device 92 or sent by communication component 93. In some embodiments, the audio component 96 further comprises a speaker for output of audio signals.

I/O interface 97 provides an interface between processing component 90 and peripheral interface modules. The aforesaid peripheral interface modules may be keyboards, click wheels, buttons, wireless mouse, etc. These buttons may include but are not limited to: volume button, start button, and lock button.

Sensor component 98 comprises one or more sensors and is used to provide status evaluations of various aspects of computing system 900. For example, sensor component 98 may detect the on/off status of computing system 900, the relative position of the component, and the presence or absence of contact between the user and computing system 900. Sensor component 98 may comprise a near sensor that is configured to detect the presence of a nearby object when there is no physical contact, including measurement of distance between the user and computing system 900. In some embodiments, sensor component 98 may further comprise a camera.

Communication component 93 is configured to facilitate wired or wireless communication between computing system 900 and other devices. Computing system 900 may access wireless networks based on a communications standard such as Wi-Fi, 2G, 3G, 4G, 5G or combinations thereof. In an embodiment, computing system 900 may comprise a SIM card slot. The SIM card slot is for inserting a SIM card, which enables computing system 900 to register with a GPRS network and establish communication between the Internet and servers.

Figure 10:
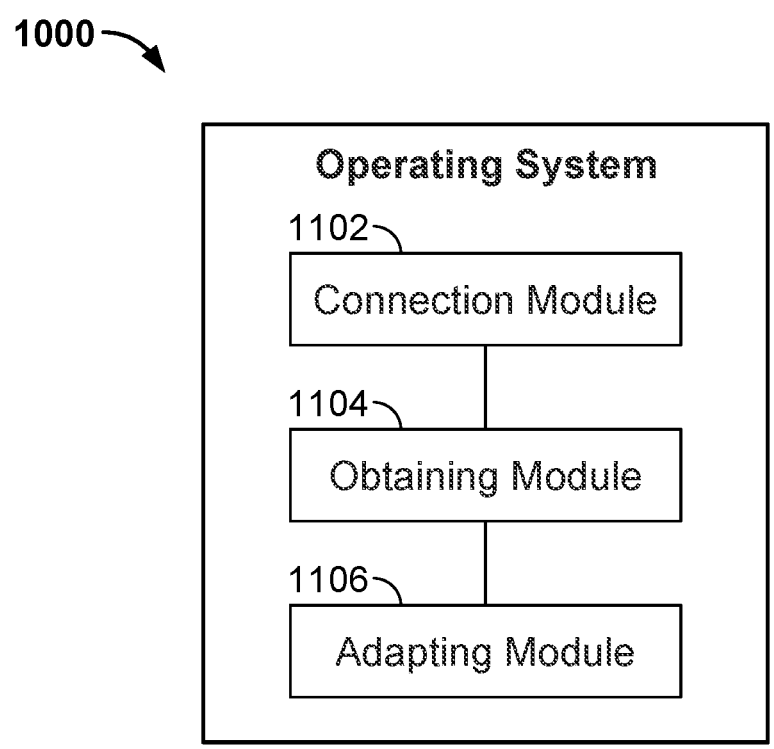
FIG. 10 is a block diagram illustrating an example operating system for connecting devices, in accordance with one or more embodiments of the present disclosure.

FIG. 10 illustrates a block diagram illustrating an example operating system, in accordance with an embodiment of the present disclosure. Operating system 1000 comprises a connection module 1102, an obtaining module 1104, and an adapting module 1106. Connection module 1102 is configured to establish connections with at least one IoT device. Obtaining module 1104 is configured to obtain a data adapter corresponding to the at least one IoT device, the data adapter being determined based on at least a part of the information included in the signals from the IoT device. Adapting module 1106 is configured to process the signals based on the data adapters, and transmit the processed signals.

In some embodiments, operating system 1000 further comprises a service providing a context agent framework, which is configured to determine service instruction information based on the obtained signals. Operating system 1000 further comprises an agent engine, which is configured to execute context-based services corresponding to the service instruction information, the context-based services including at least one unit of service. Operating system 1000 further comprises an agent host, which is configured to execute the operations corresponding to the context-based services.

Upon considering the invention disclosed here in the description and in practice, persons skilled in the art shall easily think of other schemes for implementing the present application. The present application intends to cover any variation, use, or adaptation of the present application where the variation, use, or adaptation complies with the general principles of the present application and includes public knowledge or customary technical means in the art not disclosed by the present application. The description and embodiments are regarded merely as illustrative. The true scope and spirit of the present application are indicated by the claims below.

Please also note that the term "comprise" or "contain" or any of their variants are to be taken in their non-exclusive sense. Thus, processes, methods, merchandise, or equipment that comprises a series of elements not only comprises those elements, but also comprises other elements that have not been explicitly listed or elements that are intrinsic to such processes, methods, merchandise, or equipment. In the absence of further limitations, elements that are limited by the phrase "comprises a(n) . . . " do not exclude the existence of additional identical elements in processes, methods, merchandise, or devices that comprise said elements.

The above-described are merely preferred embodiments of the present application and do not serve to limit the present application. Any modifications, equivalent substitutions, or improvements that are performed shall be contained within the protective scope of the present application.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for connecting devices, comprising:
    establishing a connection with an Internet of Things (IoT) device;
    receiving a signal from the IoT device, wherein the signal comprises a context signal;
    selecting one or more data adapters corresponding to the IoT device, wherein the one or more data adapters are selected based in part on a signal type of the signal received from the IoT device, wherein the signal type of the signal received from the IoT device is determined based at least in part on an access connectivity module associated with the IoT device, wherein the one or more data adapters correspond to one or more service contexts involving the IoT device;
    processing the signal according to the one or more data adapters, wherein the processing of the signal according to the one or more data adapters comprises:
        obtaining status parameters of the signal from the one or more data adapters;
        determining validity information of the status parameters based at least in part on determining whether respective status values of one or more status parameters are status values that are required by the one or more service contexts;
        determining one or more dynamic libraries corresponding to the context signal; and
        analyzing, using the one or more dynamic libraries, the context signal to obtain a processed context signal;
    transmitting the processed context signal via an interface to a corresponding application or an operating system to execute corresponding operations associated with the one or more service contexts;
    determining one or more service agents according to the processed context signal; and
    controlling IoT devices and/or terminal devices corresponding to the operating system according to service instruction information of the one or more service agents.

2. The method of claim 1, wherein the selecting of the one or more data adapters corresponding to the IoT device comprises:
    obtaining at least one data adapter corresponding to the IoT device via a first interface.

3. The method of claim 1, further comprising:
    obtaining a corresponding signal from the one or more data adapters and registering the obtained signal.

4. The method of claim 1, wherein the processing of the signal according to the one or more data adapters comprises:
    determining the signal needs to be converted into a recognizable format; and
    mapping the signal that needs to be converted according to the one or more data adapters to generate a recognizable signal.

5. The method of claim 1, further comprising:
    executing the operations based on the service instruction information corresponding to the one or more service agents.

6. The method of claim 1, wherein the establishing of the connection with the IoT device comprises:
    searching for available IoT devices;
    receiving search results including the IoT device; and
    establishing respective connections with one or more IoT devices in the search results to obtain connection results.

7. The method of claim 1, wherein the establishing of the connection with the IoT device comprises:
    receiving a request for connecting with the IoT device; and
    processing the request to establish the connection with the IoT device to obtain connection results.

8. The method of claim 7, comprising:
    obtaining device information of the IoT device from the connection results to verify the IoT device based on the device information; and
    in response to the IoT device being verified, adding the IoT device to a device list.

9. The method of claim 8, wherein the obtaining of the device information of the IoT device from the connection results comprises:
    obtaining frame types from data frames corresponding to the connection results; and
    obtaining the device information of the IoT device based on the frame types.

10. The method of claim 7, further comprising:
    displaying information of the IoT device at a user interface configured to allow a user to choose a specific IoT device to establish a connection with.

11. The method of claim 1, wherein the connection with the IoT device is determined based on an access mode of a connection module, wherein the connection module comprises a Bluetooth module or a Wi-Fi module, and the access mode comprises a serial peripheral interface (SPI) mode or a serial port communication mode.

12. The method of claim 3, further comprising:
    obtaining the signal from the one or more data adapters; and
    unregistering the signal.

13. The method of claim 1, wherein the one or more data adapters comprise the one or more dynamic libraries.

14. The method of claim 5, wherein the one or more service agents are configured for detecting and executing services of an application, the application corresponding to the one or more service agents.

15. The method of claim 14, wherein the one or more service agents comprise a required signal, the service instruction information, and service conditions, and the one or more service agents are configured to, upon receiving the signal and determining that the service conditions have been met, execute operations corresponding to the service instruction information, wherein the service instruction information comprises service identifying information and service operation information, the service identifying information used to determine data to be acquired, and the service operation information used to determine operations to be executed.

16. The method of claim 1, wherein the context signal comprises a temperature signal or an exercise-related signal.

17. A system for connecting devices, comprising:
one or more processors configured to:
establish a connection with an IoT device;
receive a signal from the IoT device, wherein the signal comprises a context signal;
select one or more data adapters corresponding to the IoT device, wherein the one or more data adapters are selected based in part on a signal type of the signal received from the IoT device, wherein the signal type of the signal received from the IoT device is determined based at least in part on an access connectivity module associated with the IoT device, wherein the one or more data adapters correspond to one or more service contexts involving the IoT device;
process the signal according to the one or more data adapters, wherein the processing of the signal according to the one or more data adapters comprises to:
obtain status parameters of the signal from the one or more data adapters;
determine validity information of the status parameters based at least in part on determining whether respective status values of one or more status parameters are status values that are required by the one or more service contexts;
determine one or more dynamic libraries corresponding to the context signal; and
analyze, using the one or more dynamic libraries, the context signal to obtain a processed context signal;
transmit the processed context signal via an interface to a corresponding application or an operating system to execute corresponding operations associated with the one or more service contexts;
determine one or more service agents according to the processed context signal; and
control IoT devices and/or terminal devices corresponding to the operating system according to service instruction information of the one or more service agents; and
one or more memories coupled to the one or more processors and configured to provide the one or more processors with instructions.

18. The system of claim 17, wherein the one or more processors are further configured to obtain a corresponding signal from the one or more data adapters and register the obtained signal.

19. The system of claim 17, wherein the one or more processors are further configured to:
determine the signal needs to be converted; and
map the signal that needs to be converted according to the one or more data adapters to generate a recognizable signal.

20. The system of claim 17, wherein the one or more processors are further configured to:
execute the operations based on the service instruction information corresponding to the one or more service agents.

21. The system of claim 17, wherein the one or more processors are further configured to:
display information of the IoT device at a user interface configured to allow a user to choose a specific IoT device to establish a connection with.

22. The system of claim 20, wherein the one or more service agents are configured for detecting and executing services of an application, the application corresponding to the one or more service agents, and wherein the one or more service agents comprise a required signal, the service instruction information, and service conditions, and the one or more service agents are configured to, upon receiving the signal and determining that the service conditions have been met, execute operations corresponding to the service instruction information, wherein the service instruction information comprises service identifying information and service operation information, the service identifying information used to determine data to be acquired, and the service operation information used to determine operations to be executed.

23. A computer program product for connecting devices, the computer program product being embodied in a tangible non-transitory computer readable storage medium and comprising computer instructions for:
establishing a connection with an IoT device;
receiving a signal from the IoT device, wherein the signal comprises a context signal;
selecting one or more data adapters corresponding to the IoT device, wherein the one or more data adapters are selected based in part on a signal type of the signal received from the IoT device, wherein the signal type of the signal received from the IoT device is determined based at least in part on an access connectivity module associated with the IoT device, wherein the one or more data adapters correspond to one or more service contexts involving the IoT device;
processing the signal according to the one or more data adapters, wherein the processing of the signal according to the one or more data adapters comprises:
obtaining status parameters of the signal from the one or more data adapters;
determining validity information of the status parameters based at least in part on determining whether respective status values of one or more status parameters are status values that are required by the one or more service contexts;
determining one or more dynamic libraries corresponding to the context signal; and
analyzing, using the one or more dynamic libraries, the context signal to obtain a processed context signal;
transmitting the processed context signal via an interface to a corresponding application or an operating system to execute corresponding operations associated with the one or more service contexts;
determining one or more service agents according to the processed context signal; and
controlling IoT devices and/or terminal devices corresponding to the operating system according to service instruction information of the one or more service agents.

24. The system of claim 18, wherein the one or more processors are further configured to:
obtain the signal from the one or more data adapters; and
unregister the signal.

25. The system of claim 17, wherein the one or more data adapters comprise the one or more dynamic libraries.

26. The system of claim 17, wherein the context signal comprises a temperature signal or an exercise-related signal.

\* \* \* \* \*

UNITED STATES PATENT AND TRADEMARK OFFICE
CERTIFICATE OF CORRECTION

PATENT NO. : 11,246,171 B2
APPLICATION NO. : 15/864789
DATED : February 8, 2022
INVENTOR(S) : Yuan et al.

It is certified that error appears in the above-identified patent and that said Letters Patent is hereby corrected as shown below:

On the Title Page

Item (71), applicant 1, delete "BANMA ZHTXTNG NETWORK (HONGKONG) CO., LIMITED" and insert --BANMA ZHIXING NETWORK (HONGKONG) CO., LIMITED--, therefor.
Item (73), assignee, address, insert --, (HK)--.

Signed and Sealed this
Seventh Day of June, 2022

Katherine Kelly Vidal
*Director of the United States Patent and Trademark Office*